United States Patent
Ma et al.

(10) Patent No.: US 11,653,245 B2
(45) Date of Patent: May 16, 2023

(54) TECHNIQUES FOR DETERMINING BEAM FAILURE OR RADIO LINK FAILURE

(71) Applicant: QUALCOMM Incorporated, San Diego, CA (US)

(72) Inventors: Liangping Ma, San Diego, CA (US); Xiao Feng Wang, San Diego, CA (US); Ayan Sengupta, San Diego, CA (US); Bharat Shrestha, San Diego, CA (US); Alberto Rico Alvarino, San Diego, CA (US); Umesh Phuyal, San Diego, CA (US); Jun Ma, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 19 days.

(21) Appl. No.: 17/346,960

(22) Filed: Jun. 14, 2021

(65) Prior Publication Data

US 2022/0038933 A1 Feb. 3, 2022

Related U.S. Application Data

(60) Provisional application No. 63/060,557, filed on Aug. 3, 2020.

(51) Int. Cl.
*H04L 1/18* (2006.01)
*H04L 1/20* (2006.01)
(Continued)

(52) U.S. Cl.
CPC ............... *H04W 24/10* (2013.01); *H04L 1/18* (2013.01); *H04L 1/203* (2013.01);
(Continued)

(58) Field of Classification Search
CPC ........... H04B 7/02–2696; H04B 17/0082–409; H04L 1/0001–248; H04L 5/0001–26;
(Continued)

(56) References Cited

U.S. PATENT DOCUMENTS

| 2015/0126206 A1 | 5/2015 | Krishnamurthy et al. |
| 2019/0380052 A1 | 12/2019 | Yang et al. |
| 2022/0038168 A1* | 2/2022 | Ma .................. H04W 24/10 |

FOREIGN PATENT DOCUMENTS

| WO | WO-2014068535 A2 * | 5/2014 | ............ H04W 24/10 |
| WO | WO-2019097432 A1 | 5/2019 | |

OTHER PUBLICATIONS

International Search Report and Written Opinion—PCT/US2021/037349—ISA/EPO—dated Sep. 28, 2021.

* cited by examiner

*Primary Examiner* — Timothy J Weidner
(74) *Attorney, Agent, or Firm* — Holland & Hart LLP

(57) ABSTRACT

Methods, systems, and devices for wireless communications are described. In some networks, a user equipment (UE) may perform radio link monitoring according to one or more radio link monitoring configurations. The UE may select a radio link monitoring configuration from a first radio link monitoring configuration associated with radio link monitoring over a duration that a hybrid automatic repeat request (HARQ) process is enabled and a second radio link monitoring configuration associated with radio link monitoring over a duration that the HARQ process is disabled. The UE may monitor reference signals using the selected radio link monitoring configuration, and may determine a radio link failure, a beam failure, or both has occurred based on monitoring the one or more reference signals using the (Continued)

selected radio link monitoring configuration. The UE may subsequently transmit a measurement report based on determining the radio link failure, the beam failure, or both.

30 Claims, 16 Drawing Sheets

(51) Int. Cl.

| | |
|---|---|
| *H04L 41/0681* | (2022.01) |
| *H04L 41/0686* | (2022.01) |
| *H04L 43/06* | (2022.01) |
| *H04L 43/0805* | (2022.01) |
| *H04W 8/24* | (2009.01) |
| *H04W 24/10* | (2009.01) |
| *H04W 28/04* | (2009.01) |
| *H04W 56/00* | (2009.01) |
| *H04W 76/25* | (2018.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ...... *H04L 41/0681* (2013.01); *H04L 41/0686* (2013.01); *H04L 43/06* (2013.01); *H04L 43/0805* (2013.01); *H04W 8/245* (2013.01); *H04W 28/04* (2013.01); *H04W 56/0015* (2013.01); *H04W 76/25* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ... H04L 41/02–5096; H04L 43/02–55; H04W 8/22–245; H04W 24/02–10; H04W 28/02–26; H04W 36/0005–385; H04W 48/02–20; H04W 56/0005–0095; H04W 72/005–14; H04W 74/002–008; H04W 76/10–50; H04W 84/02–16; H04W 88/02–12; H04W 92/02–04; H04W 92/10
See application file for complete search history.

TECHNIQUES FOR DETERMINING BEAM FAILURE OR RADIO LINK FAILURE

CROSS REFERENCE

The present Application for Patent claims the benefit of U.S. Provisional Patent Application No. 63/060,557 by M A et al., entitled "TECHNIQUES FOR DETERMINING BEAM FAILURE OR RADIO LINK FAILURE," filed Aug. 3, 2020, assigned to the assignee hereof, and expressly incorporated by reference herein.

FIELD OF TECHNOLOGY

The following relates to wireless communications, including techniques for determining beam failure or radio link failure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a UE may monitor reference signals to perform channel measurements, which may support evaluating channel quality. In some cases, when monitoring for reference signals, the UE may identify a radio link failure, a beam failure, or both.

SUMMARY

The described techniques relate to improved methods, systems, devices, and apparatuses that support multiple radio link monitoring configurations for determining radio link failure, beam failure, or both. In some aspects, the described techniques may improve determination of radio link failure, beam failure, of both, in the context of a non-terrestrial network (NTN). In some aspects, a UE may be configured to determine radio link failures and beam failures according to a first radio link monitoring configuration over at least a duration that hybrid automatic repeat request (HARQ) processes are enabled, and may determine radio link failures and beam failures according to a second radio link monitoring configuration over at least a duration that HARQ processes are disabled. In some cases, a base station and/or satellite may dynamically indicate (e.g., via radio resource control (RRC) or medium access control-control element (MAC-CE) signaling) which radio link monitoring configuration the UE is to utilize. Alternatively, the UE may be configured with both the first radio link monitoring configuration and the second radio link monitoring configuration (e.g., via RRC or system information broadcast (SIB) signaling). In such cases, the UE may determine whether to utilize the first or second radio link monitoring configurations by determining whether a HARQ process is enabled or disabled. In some aspects, the second radio link monitoring configuration may be associated with lower block error rate (BLER) thresholds used to determine radio link failure and/or beam failure. In this regard, second radio link monitoring may utilize a more stringent set of parameters to determine radio link failure and/or beam failure over at least a duration that HARQ is disabled. By configuring and/or signaling the UE to implement multiple radio link monitoring configurations dependent upon an operational state of HARQ processes, techniques described herein may enable efficient determination of radio link failures and/or beam failures in the context of NTNs over at least a duration that HARQ processes are disabled.

A method of wireless communication at a UE is described. The method may include selecting a second radio link monitoring configuration from a first radio link monitoring configuration associated with radio link monitoring over at least a duration that a HARQ process is enabled, and the second radio link monitoring configuration associated with radio link monitoring over at least a duration that the HARQ process is disabled, monitoring one or more reference signals using the second radio link monitoring configuration; determining a radio link failure, a beam failure, or both, based on monitoring the one or more reference signals using the second radio link monitoring configuration, and transmitting a beam measurement report based on determining the radio link failure, the beam failure, or both.

An apparatus for wireless communication at a UE is described. The apparatus may include a processor, memory coupled with the processor, and instructions stored in the memory. The instructions may be executable by the processor to cause the apparatus to select a second radio link monitoring configuration from a first radio link monitoring configuration associated with radio link monitoring over at least a duration that a HARQ process is enabled, and the second radio link monitoring configuration associated with radio link monitoring when the HARQ process is disabled, monitor one or more reference signals using the second radio link monitoring configuration; determining a radio link failure, a beam failure, or both, based on monitoring the one or more reference signals using the second radio link monitoring configuration, and transmit a beam measurement report based on determining the radio link failure, the beam failure, or both.

Another apparatus for wireless communication at a UE is described. The apparatus may include means for selecting a second radio link monitoring configuration from a set that includes a first radio link monitoring configuration associated with radio link monitoring over at least a duration that a HARQ process is enabled, and the second radio link monitoring configuration associated with radio link monitoring over at least a duration that the HARQ process is disabled, monitoring one or more reference signals using the second radio link monitoring configuration; determining a radio link failure, a beam failure, or both, based on monitoring the one or more reference signals using the second radio link monitoring configuration, and transmitting a beam measurement report based on determining the radio link failure, the beam failure, or both.

A non-transitory computer-readable medium storing code for wireless communication at a UE is described. The code may include instructions executable by a processor to select a second radio link monitoring configuration from a first radio link monitoring configuration associated with radio link monitoring over at least a duration that a HARQ process is enabled, and the second radio link monitoring configuration associated with radio link monitoring over at least a duration that the HARQ process is disabled, monitor one or more reference signals using the second radio link monitoring configuration; determining a radio link failure, a beam failure, or both, based on monitoring the one or more reference signals using the second radio link monitoring configuration, and transmit a beam measurement report based on determining the radio link failure, the beam failure, or both.

Some examples of the method, apparatuses, and non-transitory computer-readable medium described herein may further include operations, features, means, or instructions for determining a first BLER threshold and a second BLER threshold associated with the first radio link monitoring configuration, the first BLER threshold including a first in-sync detection threshold and the second BLER threshold including a first out-of-sync detection threshold, and determining a third BLER threshold and a fourth BLER threshold associated with the second radio link monitoring configuration, the third BLER threshold including a second in-sync detection threshold and the fourth BLER threshold including a second out-of-sync detection threshold, where the first BLER threshold, the second BLER threshold, the third BLER threshold, and the fourth BLER threshold may be associated with a radio link failure detection procedure at the UE.

In some examples of the method, apparatuses, and non-transitory computer-readable medium described herein, the first BLER threshold and the third BLER threshold each include a $BLER_{in}$ threshold, and where the second BLER threshold and the fourth BLER threshold each include a $BLER_{out}$ threshold.

In some examples of the method, apparatuses, and non-transitory computer-readable medium described herein, the first BLER threshold may be greater than the third BLER threshold, and where the second BLER threshold may be greater than the fourth BLER threshold.

Some examples of the method, apparatuses, and non-transitory computer-readable medium described herein may further include operations, features, means, or instructions for determining one or more BLERs associated with the one or more reference signals based on monitoring the one or more reference signals, and determining that the one or more BLERs satisfy the third BLER threshold, the fourth BLER threshold, or both, where the determining of the radio link failure, the beam failure, or both, may be based on determining the one or more BLERs satisfy the third BLER threshold, the fourth BLER threshold, or both.

Some examples of the method, apparatuses, and non-transitory computer-readable medium described herein may further include operations, features, means, or instructions for determining a sixth BLER threshold associated with the second radio link monitoring configuration, the sixth BLER threshold greater than the third BLER threshold and less than the fourth BLER threshold, the sixth BLER threshold including a third out-of-sync detection threshold associated with the radio link failure detection procedure at the UE, and determining that the one or more BLERs satisfy the sixth BLER threshold, where the determining of the radio link failure, the beam failure, or both, may be based on determining the one or more BLERs satisfy the sixth BLER threshold.

Some examples of the method, apparatuses, and non-transitory computer-readable medium described herein may further include operations, features, means, or instructions for receiving, from a node of a wireless communications system, a downlink transmission including an indication of the second radio link monitoring configuration, where the selecting of the second radio link monitoring configuration may be based on receiving the indication.

In some examples of the method, apparatuses, and non-transitory computer-readable medium described herein, the downlink transmission includes an RRC message, a MAC-CE message, or both.

Some examples of the method, apparatuses, and non-transitory computer-readable medium described herein may further include operations, features, means, or instructions for receiving, from a node of a wireless communications system, downlink transmission including an indication of the first radio link monitoring configuration and the second radio link monitoring configuration, where the selecting of the second radio link monitoring configuration may be based on receiving the downlink transmission.

Some examples of the method, apparatuses, and non-transitory computer-readable medium described herein may further include operations, features, means, or instructions for determining that the HARQ process may be disabled based on receiving the downlink transmission, where the selecting of the second radio link monitoring configuration may be based on determining that the HARQ process may be disabled.

In some examples of the method, apparatuses, and non-transitory computer-readable medium described herein, the downlink transmission includes an RRC message, an SIB message, or both.

Some examples of the method, apparatuses, and non-transitory computer-readable medium described herein may further include operations, features, means, or instructions for determining a second BLER threshold associated with the second radio link monitoring configuration, where a first BLER threshold associated with the first radio link monitoring configuration may be greater than the second BLER threshold associated with the second radio link monitoring configuration, the first BLER threshold and the second BLER threshold associated with a beam failure detection procedure at the UE.

Some examples of the method, apparatuses, and non-transitory computer-readable medium described herein may further include operations, features, means, or instructions for determining a BLER associated with a beam based on monitoring the one or more reference signals, and determining that the BLER satisfies the second BLER threshold associated with the second radio link monitoring configuration, where the determining of the radio link failure, the beam failure, or both, may be based on determining that the BLER satisfies the second BLER threshold.

In some examples of the method, apparatuses, and non-transitory computer-readable medium described herein, the one or more reference signals may be received from a node of a NTN.

A method of wireless communication at a network device is described. The method may include transmitting, to a UE, a downlink transmission including an indication of a second radio link monitoring configuration associated with radio link monitoring over at least a duration that a HARQ process is disabled, the second radio link monitoring configuration different from a first radio link monitoring configuration associated with radio link monitoring over at least a duration that the HARQ process is enabled, transmitting, to the UE, one or more reference signals based on the indication of the second radio link monitoring configuration, and receiving, from the UE, a beam measurement report based on transmitting the one or more reference signals, the beam measurement report based on the second radio link monitoring configuration, the beam measurement report including an indication of a radio link failure, a beam failure, or both.

An apparatus for wireless communication at a network device is described. The apparatus may include a processor, memory coupled with the processor, and instructions stored in the memory. The instructions may be executable by the processor to cause the apparatus to transmit, to a UE, a downlink transmission including an indication of a second radio link monitoring configuration associated with radio link monitoring over at least a duration that a HARQ process is disabled, the second radio link monitoring configuration different from a first radio link monitoring configuration associated with radio link monitoring over at least a duration that the HARQ process is enabled, transmit, to the UE, one or more reference signals based on the indication of the second radio link monitoring configuration, and receive, from the UE, a beam measurement report based on transmitting the one or more reference signals, the beam measurement report based on the second radio link monitoring configuration, the beam measurement report including an indication of a radio link failure, a beam failure, or both.

Another apparatus for wireless communication at a network device is described. The apparatus may include means for transmitting, to a UE, a downlink transmission including an indication of a second radio link monitoring configuration associated with radio link monitoring over at least a duration that a HARQ process is disabled, the second radio link monitoring configuration different from a first radio link monitoring configuration associated with radio link monitoring over at least a duration that the HARQ process is enabled, transmitting, to the UE, one or more reference signals based on the indication of the second radio link monitoring configuration, and receiving, from the UE, a beam measurement report based on transmitting the one or more reference signals, the beam measurement report based on the second radio link monitoring configuration, the beam measurement report including an indication of a radio link failure, a beam failure, or both.

A non-transitory computer-readable medium storing code for wireless communication at a network device is described. The code may include instructions executable by a processor to transmit, to a UE, a downlink transmission including an indication of a second radio link monitoring configuration associated with radio link monitoring over at least a duration that a HARQ process is disabled, the second radio link monitoring configuration different from a first radio link monitoring configuration associated with radio link monitoring over at least a duration that the HARQ process is enabled, transmit, to the UE, one or more reference signals based on the indication of the second radio link monitoring configuration, and receive, from the UE, a beam measurement report based on transmitting the one or more reference signals, the beam measurement report based on the second radio link monitoring configuration, the beam measurement report including an indication of a radio link failure, a beam failure, or both.

Some examples of the method, apparatuses, and non-transitory computer-readable medium described herein may further include operations, features, means, or instructions for determining a first BLER threshold and a second BLER threshold associated with the first radio link monitoring configuration, the first BLER threshold including a first in-sync detection threshold and the second BLER threshold including a first out-of-sync detection threshold, and determining a third BLER threshold and a fourth BLER threshold associated with the second radio link monitoring configuration, the third BLER threshold including a second in-sync detection threshold and the fourth BLER threshold including a second out-of-sync detection threshold, where the first BLER threshold, the second BLER threshold, the third BLER threshold, and the fourth BLER threshold may be associated with a radio link failure detection procedure at the UE.

In some examples of the method, apparatuses, and non-transitory computer-readable medium described herein, the first BLER threshold and the third BLER threshold each include a $BLER_{in}$ threshold, and where the second BLER threshold and the fourth BLER threshold each include a $BLER_{out}$ threshold.

In some examples of the method, apparatuses, and non-transitory computer-readable medium described herein, the first BLER threshold may be greater than the third BLER threshold, and where the second BLER threshold may be greater than the fourth BLER threshold.

Some examples of the method, apparatuses, and non-transitory computer-readable medium described herein may further include operations, features, means, or instructions for determining a sixth BLER threshold associated with the second radio link monitoring configuration, the sixth BLER threshold greater than the third BLER threshold and less than the fourth BLER threshold, the sixth BLER threshold including a third out-of-sync detection threshold associated with the radio link failure detection procedure at the UE, and transmitting, to the UE via the downlink transmission, an indication of the sixth BLER threshold, where receiving the beam measurement report may be based on the indication of the sixth BLER threshold.

In some examples of the method, apparatuses, and non-transitory computer-readable medium described herein, the downlink transmission includes an indication for the UE to perform radio link monitoring via the second radio link monitoring configuration.

In some examples of the method, apparatuses, and non-transitory computer-readable medium described herein, the downlink transmission includes an RRC message, a MAC-CE message, or both.

Some examples of the method, apparatuses, and non-transitory computer-readable medium described herein may further include operations, features, means, or instructions for transmitting, to the UE via the downlink transmission, an indication of the first radio link monitoring configuration, where the downlink transmission further includes an indication for the UE to perform radio link monitoring using the second radio link monitoring configuration over at least a duration that the HARQ process may be disabled, and an indication for the UE to perform radio link monitoring using the first radio link monitoring configuration over at least a duration that the HARQ process may be enabled.

In some examples of the method, apparatuses, and non-transitory computer-readable medium described herein, the downlink transmission includes an RRC message, an SIB message, or both.

Some examples of the method, apparatuses, and non-transitory computer-readable medium described herein may further include operations, features, means, or instructions for determining a second BLER threshold associated with the second radio link monitoring configuration, where a first BLER threshold associated with the first radio link monitoring configuration may be greater than the second BLER threshold associated with the second radio link monitoring configuration, the first BLER threshold and the second BLER threshold associated with a beam failure detection procedure at the UE.

In some examples of the method, apparatuses, and non-transitory computer-readable medium described herein, the network device includes a node of a NTN.

DETAILED DESCRIPTION

Figure 1:
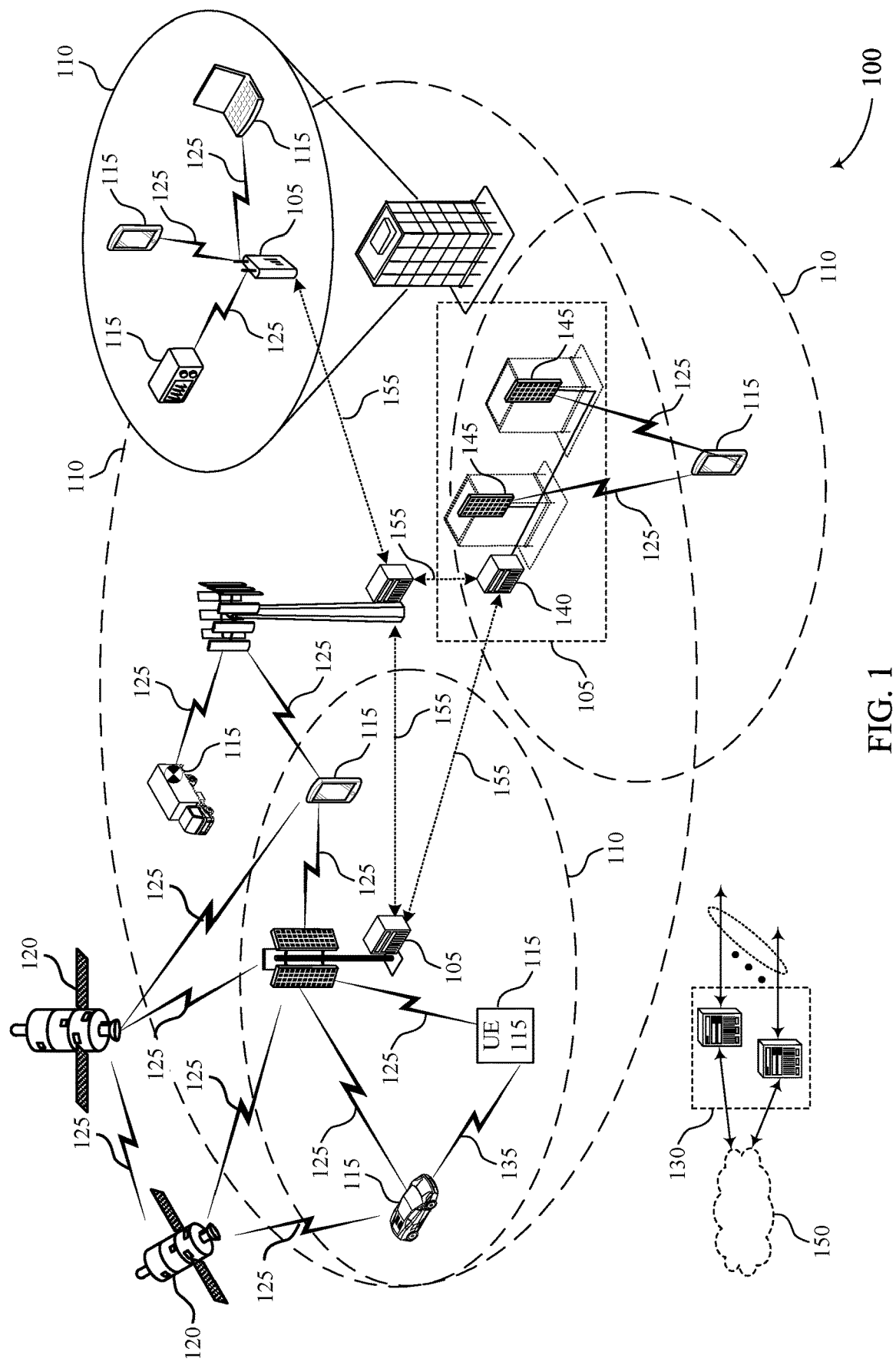
FIG. 1 illustrates an example of a wireless communications system that supports techniques for determining beam failure or radio link failure in accordance with aspects of the present disclosure.

Non-terrestrial networks (NTNs) may employ a satellite or other overhead node that communicates (e.g., transmits, receives) using beams according to beam coverage areas that move with the overhead node. The distance between a user equipment (UE) and a satellite of an NTN may result in large propagation delays for signals transmitted between the two devices. In some cases, NTNs may utilize hybrid automatic repeat request (HARQ) processes for communications between UEs and satellites. These stop-and-wait HARQ processes may significantly decrease data throughput in NTNs due to the large propagation delays in NTNs. Accordingly, it may be desirable to disable HARQ processes to increase data throughput in NTNs. However, in cases where HARQ processes are disabled, the absence of HARQ feedback may lead to difficulties in radio link monitoring. In particular, disabling HARQ processes may result in difficulties with determining radio link failure, beam failure, or both.

To address issues associated with radio link monitoring, techniques for multiple radio link monitoring configurations are disclosed. In some aspects, a UE may be configured to determine radio link failures and beam failures according to a first radio link monitoring configuration over at least a duration that HARQ processes are enabled, and may determine radio link failures and beam failures according to a second radio link monitoring configuration over at least a duration that HARQ processes are disabled. In some cases, a base station and/or satellite may dynamically indicate which radio link monitoring configuration the UE is to utilize. Alternatively, the UE may be configured with both the first radio link monitoring configuration and the second radio link monitoring configuration (e.g., via radio resource control (RRC) or system information broadcast (SIB) signaling). In such cases, the UE may determine whether to utilize the first or second radio link monitoring configurations by determining whether or not a HARQ process is enabled or disabled.

In some aspects, the second radio link monitoring configuration may be associated with lower block error rate (BLER) thresholds used to determine radio link failure and/or beam failure. In this regard, the second radio link monitoring may utilize a more stringent set of parameters to determine radio link failure and/or beam failure over at least a duration that HARQ is disabled. By configuring and/or signaling the UE to implement multiple radio link monitoring configurations dependent upon an operational state of HARQ processes, techniques described herein may enable efficient determination of radio link failures and/or beam failures in the context of NTNs over at least a duration that HARQ processes are disabled.

Aspects of the disclosure are initially described in the context of wireless communications systems. Aspects of the disclosure are additionally described in the context of an example process flow. Aspects of the disclosure are further illustrated by and described with reference to apparatus diagrams, system diagrams, and flowcharts that relate to techniques for determining beam failure or radio link failure.

FIG. 1 illustrates an example of a wireless communications system 100 that supports techniques for determining beam failure or radio link failure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 155 (e.g., via an S1, N2, N3, or other interface). The base stations 105 may communicate with one another over the backhaul links 155 (e.g., via an X2, Xn, or other interface) either directly (e.g., directly between base stations 105), or indirectly (e.g., via core network 130), or both. In some examples, the backhaul links 155 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $\Delta l_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 120. A satellite 120 may communicate with base stations 105, which may be referred to as gateways in an NTN, and UEs 115, which may include other high altitude or terrestrial communications devices. In some examples, a satellite 120 itself may be an example of a base station 105. A satellite 120 may be any suitable type of communication satellite configured to relay or otherwise support communications between different devices in the wireless communications system 100. A satellite 120 may be an example of a space satellite, a balloon, a dirigible, an airplane, a drone, an unmanned aerial vehicle, or other vehicle which may support communications from a generally non-terrestrial, overhead, or elevated position. In some examples, a satellite 120 may be in a geosynchronous or geostationary earth orbit, a low earth orbit, or a medium earth orbit. A satellite 120 may be a multi-beam satellite configured to provide service for multiple service beam coverage areas in a configured geographical service area. The satellite 120 may be any distance away from the surface of the earth or other reference surface.

In some examples, a cell may be provided or established by a satellite 120 as part of an NTN. A satellite 120 may, in some cases, perform the functions of a base station 105, act as a bent-pipe satellite, or act as a regenerative satellite, or a combination thereof. In some examples, a satellite 120 may be an example of a smart satellite, or a satellite with intelligence or other communications processing capability. For example, a smart satellite may be configured to perform more functions than a regenerative satellite (e.g., may be configured to perform particular algorithms beyond those used in regenerative satellites, to be reprogrammed). In a bent-pipe transponder configuration, a satellite 120 may be configured to receive signals from ground stations (e.g., gateways, base stations 105, a core network 130) and transmit those signals to different ground stations or terminals (e.g., UEs 115, base stations 105). In some cases, a satellite 120 supporting a bent-pipe transponder configuration may amplify signals or shift from uplink frequencies to downlink frequencies. In some examples, a satellite 120 supporting a regenerative transponder configuration may relay signals like a bent-pipe transponder configuration, but may also use on-board processing to perform other functions. Examples of these other functions may include demodulating a received signal, decoding a received signal, re-encoding a signal to be transmitted, modulating the signal to be transmitted, or a combination thereof. In some examples, a satellite 120 supporting a bent pipe transponder configuration or regenerative transponder configuration may receive a signal from a base station 105 and may relay the signal to a UE 115 or base station 105, or vice-versa.

In accordance with examples as disclosed herein, the wireless communications system 100 may be configured to provide (e.g., via a base station 105, via a satellite 120) one or more radio link monitoring configurations to a UE 115 that indicate parameters (e.g., measurement thresholds) for monitoring reference signals transmitted by a base station 105 and/or satellite 120. For example, a first radio link monitoring configuration may be associated with radio link monitoring at the UE 115 over at least a duration that a HARQ process is enabled at the UE 115, and a second radio link monitoring configuration may be associated with radio link monitoring at the UE 115 over at least a duration that the HARQ process is disabled at the UE 115.

In some cases, the base station 105 and/or satellite 120 may dynamically indicate which radio link monitoring configuration the UE 115 is to utilize. In this regard, the UE 115 may be configured with a "default" radio link monitoring configuration (e.g., the first radio link monitoring configuration for HARQ enabled, or a third radio link monitoring configuration), and may transition to utilizing the second radio link monitoring configuration for HARQ disabled based on dynamic signaling from the base station 105 and/or satellite 120. Additionally or alternatively, the UE 115 may be configured with both the first radio link monitoring configuration and the second radio link monitoring configuration (e.g., via RRC and/or SIB signaling). In such cases, the UE 115 may determine whether to utilize the first or second radio link monitoring configurations by determining whether or not a HARQ process is enabled or disabled. In some aspects, the second radio link monitoring configuration associated with radio link monitoring over at least a duration that HARQ process are disabled may be associated with lower BLER thresholds used to determine radio link failure and/or beam failure. In this regard, the second radio link monitoring may utilize a more stringent set of parameters to determine radio link failure and/or beam failure over at least a duration that HARQ is disabled.

Techniques described herein may enable more flexible and reliable radio link monitoring. In particular, by configuring and/or signaling the UE 115 to implement multiple radio link monitoring configurations dependent upon an operational state of HARQ processes, techniques described herein may enable efficient determination of radio link failures and/or beam failures in the context of NTNs over at least a duration that HARQ processes are disabled. Moreover, by enabling multiple radio link monitoring configurations, the wireless communications system 100 may support improved flexibility and responsiveness for NTN communications.

Figure 2:
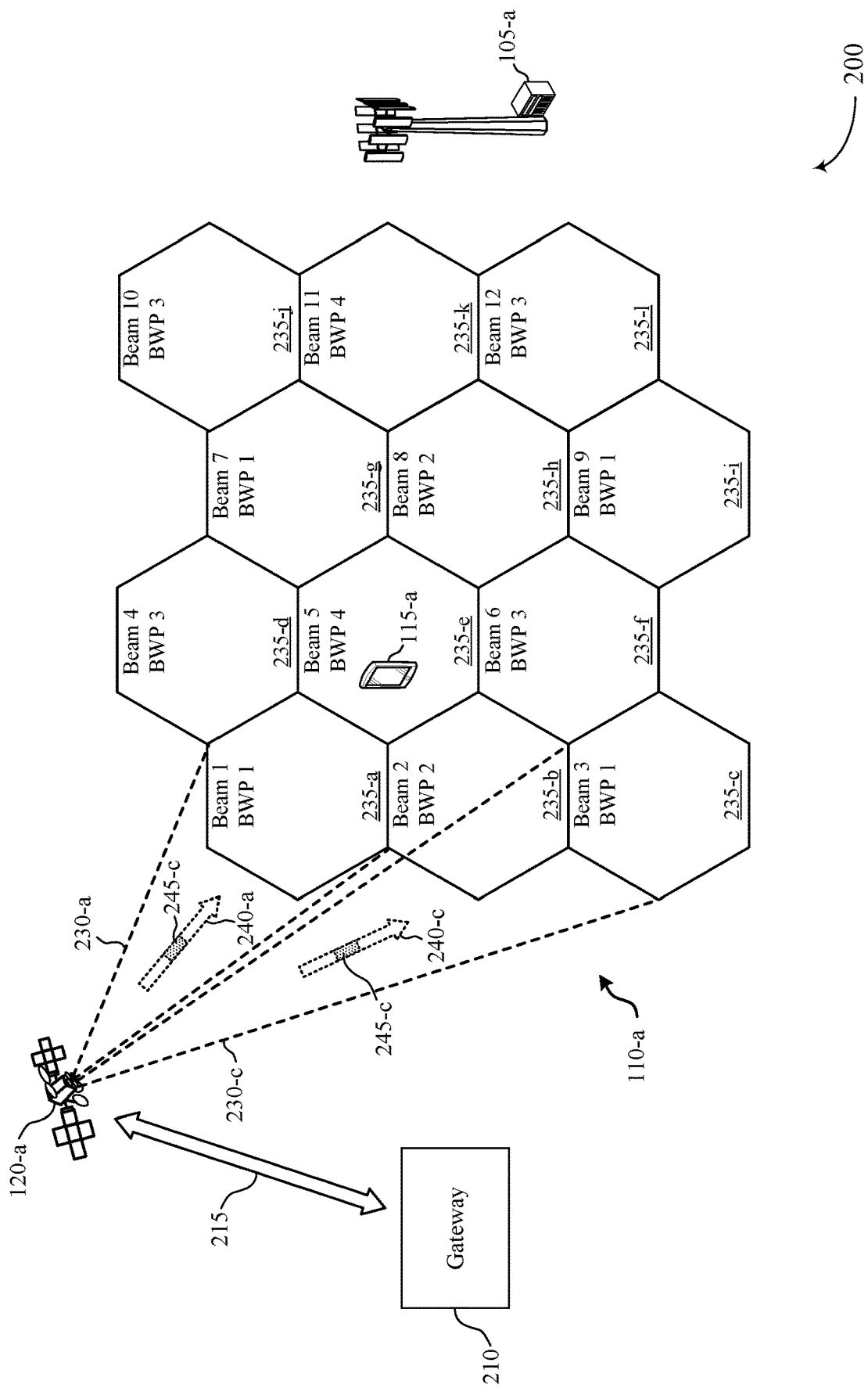
FIG. 2 illustrates an example of a wireless communications system that supports techniques for determining beam failure or radio link failure in accordance with aspects of the present disclosure.

FIG. 2 illustrates an example of a wireless communications system 200 that supports techniques for determining beam failure or radio link failure in accordance with aspects of the present disclosure. In some examples, the wireless communications system 200 may implement aspects of the wireless communications system 100. For example, wireless communications system 200 may include a UE 115-a and a satellite 120-a. In some examples, the wireless communications system 200 may also include a gateway 210, or a base station 105-a, or both. In various examples, one or more of the satellite 120-a, the gateway 210, or base station 105-a, or various combinations thereof, may be connected with a network, such as a core network 130 described with reference to FIG. 1.

The satellite 120-a may be configured to support communications over a geographic coverage area 110-a. The geographic coverage area 110-a may be located at a relatively fixed location (e.g., when the satellite 120-a is in a geostationary orbit or otherwise generally fixed overhead location), or may move or sweep across locations (e.g., as a moving geographic coverage area, such as when the satellite 120-a is in a low-earth orbit or medium earth orbit, or is otherwise moving overhead).

In some examples, the satellite 120-a may be an example of, or configured to operate as, a smart satellite, where the satellite 120-a supports a capability for processing communications associated with the coverage area 110-a (e.g., uplink communications, downlink communications, or both). In examples where the satellite 120-a is configured to operate as a smart satellite, the satellite 120-a may be an example of a base station 105 as described herein (e.g., where the satellite 120-a operates as a gNB or other type of base station), and the satellite 120-a may or may not communicate with a core network 130 via the gateway 210 (e.g., over a gateway communication link 215).

In some examples, the satellite 120-a may be an example of, or configured to operate as, a bent-pipe transponder or a regenerative transponder, where the satellite 120-a may operate as a relay between the gateway 210 and one or more devices within the geographic coverage area 110-a (e.g., relaying signals received from the geographic coverage area 110-a over a gateway communication link 215, relaying signals received from the gateway 210 over a gateway communication link 215 as transmissions to devices in the geographic coverage area 110-a. In examples where the satellite 120-a is configured to operate as a bent-pipe or regenerative transponder, the gateway 210, or the combination of the gateway 210 and the satellite 120-a, may be an example of a base station 105 as described herein (e.g., where the gateway 210 operates as a gNB or other type of base station 105, where the combination of the satellite 120-a and the gateway 210 operates as a gNB or other type of base station 105).

The satellite 120-a may be configured to support communications using a plurality of transmission or reception beams, which may refer to spatial or directional communication resources formed by or otherwise supported by an antenna array of the satellite 120-a according to various beamforming techniques. For example, the satellite 120-a may be configured to support a plurality of beams 230, which may refer to downlink beams (e.g., downlink transmission beams) that support downlink communications 240 over the geographic coverage area 110-a. Each beam 230 may be associated with a corresponding beam coverage area 235 (e.g., beam coverage area 235-a corresponding to beam 230-a, and so on), and a plurality of beams 230 or beam coverage areas 235 (e.g., beam coverage areas 235-a through 235-1) may be distributed across the geographic coverage area 110-a. In some examples, beams 230 may support both downlink and uplink communications. In some examples, a first set of beams 230 (e.g., transmission beams) may support downlink communications and a second set of beams 230 (e.g., reception beams, of a different antenna array, associated with different directions or different beam coverage areas 235) may support uplink communications. In various examples, each of the beams 230 may be configured to operate as a different cell, or one or more cells may be configured according to sets of two or more beams 230, or all of the beams 230 may be configured to operate as a single cell.

Although the beam coverage areas 235 are shown as nested hexagonal areas for illustrative purposes, beams 230 may have some degree of overlap. For example, transmitted signal energy from one beam 230 may be incident on one or more beam coverage areas 235 that are adjacent to the beam coverage area 235 corresponding to the transmitting beam 230 (e.g., transmissions of a beam 230 associated with the beam coverage area 235-e may be incident on one or more of beam coverage areas 235-a, 235-b, 235-d, 235-f, 235-g, or 235-h, and transmissions of beams 230 associated beam coverage areas 235-a, 235-b, 235-d, 235-f, 235-g, or 235-h, may be incident on the beam coverage area 235-e and so on). To reduce interference between adjacent or neighboring beams 230, each of the beams 230 may be configured with a respective BWP such that adjacent beams 230 are configured for communication over different BWPs. In one example, such frequency separation may be provided by a pattern of four BWPs, each spanning a different range of a radio frequency spectrum (e.g., Beams 1, 3, 7, and 9 being associated with a BWP 1, Beams 2 and 8 being associated with a BWP 2, Beams 4, 6, 10, and 12 being associated with a BWP 3, and Beams 5 and 11 being associated with a BWP 4).

In some examples, the UE 115-a may establish a communication link with or via the satellite 120-a while the UE 115-a is located within the geographic coverage area 110-a. To maintain such a communication link, the UE 115-a may switch between beams 230 relatively frequently, due to mobility of the UE 115-a (e.g., where the UE 115-a moves from one beam coverage area 235 to another), mobility of the satellite 120-a (e.g., where the geographic coverage area 110-a or one or more beam coverage areas 235 move relative to the UE 115-a), or various combinations thereof. In some examples, to support such beam switching or selection, the UE 115-a may perform beam measurement operations to evaluate channel quality for communications via one or more beams 230. For example, the UE 115-a may monitor or measure reference signals 245 included in the downlink communications 240 for respective beams 230, which may include or be otherwise associated with a beam identifier carried in the downlink communications 240.

In a NTN, such as wireless communications system 200 supported by a transmitting satellite 120-a, the UE 115-a may perform beam switching relatively frequently, based on factors such as movement of satellite beam coverage areas 235 (e.g., 7 km/sec for some low-earth orbit (LEO) satellites), Doppler effects associated with the movement of the satellite 120-a, size of the beam coverage areas 235, (e.g., 70 kilometers by 300 kilometers, which may be relatively small in combination with the rate of movement of the beam coverage areas 235), or any combination thereof. In some examples, such beam switching may be performed more often or more quickly than cell handovers in a terrestrial network. Further, although for line-of-sight communications a beam footprint may be relatively predictable, in non-line-of-sight communications, which may be applicable to communications between the satellite 120-a and devices in the geographic coverage area 110-a (e.g., due to obstructions or reflecting features such as buildings, canyons, mountains, or other signal-blocking or signal-altering features), a beam footprint may be less predictable, such that beam measurement may become more important to evaluation of and switching between beams 230.

According to some techniques, a UE 115 may be configured to transmit a status report to the network to report the quality of a cell (e.g., a serving cell) or cell pair (e.g., a serving cell and a neighboring cell), to reduce the likelihood of communication degradation for the UE 115. For example, a UE 115 may be configured to perform Layer-1 (L1) measurement and reporting for various cells based on reference signals. In some such techniques, a UE 115 may periodically report an L1 reference signal received power (RSRP) based on a CSI-RS or synchronization signal block (SSB). In various examples, such a report may be transmitted periodically, semi-persistently, or aperiodically. Additionally or alternatively, radio resource management (RRM) reporting may be performed based on one or more cell-level measurements. In some examples, such techniques may be triggered based on various events that indicate changes in the quality of a serving cell or one or more neighboring cells. However, such reporting at a cell level may include a consolidation of beam statistics, and therefore may not report statistics for individual beams 230. In examples where each of the beam coverage areas 235 is associated with a single cell, certain techniques for cell-level measurement may therefore not report changes of channel quality using different beams 230 in the same cell, and accordingly may not be suitable for certain aspects of networks such as NTNs.

In accordance with examples as disclosed herein, the wireless communications system 200 may be configured to support multiple radio link monitoring configurations for radio link monitoring at the UE 115-a. In particular, the UE 115-a of the wireless communications system 200 may be configured to perform radio link monitoring to determine radio link failures, beam failures (e.g., failure of a beam 230), or both, according to multiple radio link monitoring configurations. For example, a first radio link monitoring configuration may be associated with radio link monitoring at the UE 115-a over at least a duration that a HARQ process is enabled at the UE 115-a, and a second radio link monitoring configuration may be associated with radio link monitoring at the UE 115-a over at least a duration that the HARQ process is disabled at the UE 115-a.

In some cases, the satellite 120-a may dynamically indicate which radio link monitoring configuration the UE 115-a is to utilize. In this regard, the UE 115-a may be configured with a "default" radio link monitoring configuration (e.g., the first radio link monitoring configuration for HARQ enabled, or a third radio link monitoring configuration), and may transition to utilizing the second radio link monitoring configuration for HARQ disabled based on dynamic signaling from the satellite 120-a. Additionally or alternatively, the UE 115-a may be configured with both the first radio link monitoring configuration and the second radio link monitoring configuration (e.g., via RRC and/or SIB signaling). In such cases, the UE 115-a may determine whether to utilize the first or second radio link monitoring configurations by determining whether or not a HARQ process is enabled or disabled. In some aspects, the second radio link monitoring configuration associated with radio link monitoring over at least a duration that HARQ process are disabled may be associated with lower BLER thresholds used to determine radio link failure and/or beam failure. In this regard, the second radio link monitoring may utilize a more stringent set of parameters to determine radio link failure and/or beam failure over at least a duration that HARQ is disabled.

In the context of wireless communications system 200, the UE 115-a may select a radio link monitoring configuration (e.g., the first radio link monitoring configuration for HARQ enabled, the second radio link monitoring configuration for HARQ disabled, or a third radio link monitoring configuration), and monitor reference signals 245 received from the satellite 120-a using (e.g., according to) the selected radio link monitoring configuration. For example, the UE 115-a may monitor reference signals 245 and perform measurements to determine one or more parameters associated with the reference signals 245, a beam 230, or both. Parameters may include, but are not limited to, BLER values, RSRP values, reference signal received quality (RSRQ) values, SNR values, SINR values, or any combination thereof. Subsequently, the UE 115-a may compare determined parameters associated with the reference signals 245 and/or beams 230 with parameter thresholds (e.g., BLER thresholds, RSRP/RSRQ thresholds, SNR/SINR thresholds) associated with the selected radio link monitoring configuration in order to determine a radio link failure, a beam failure, or both.

In this regard, the UE 115-a may determine radio link failure, beam failure, or both, according to the selected radio link monitoring configuration. In some examples, the UE 115-a may transmit a measurement report (e.g., feedback report, beam measurement report, radio link measurement report) to or via the same device that transmits the beams 230 (e.g., the satellite 120-a), which may include a transmission to the gateway 210 via the satellite 120-a (e.g., when the satellite 120-a operates as a bent-pipe or regenerative transponder). In some examples, the UE 115-a may transmit a measurement report to another device (e.g., to the base station 105-a), such as in examples where the base station 105-a or a core network 130 facilitates aspects of selecting beams 230 for communicating with the UE 115-a via the satellite 120-a.

Techniques described herein may enable more flexible and reliable radio link monitoring. In particular, by configuring and/or signaling the UE 115-a to implement multiple radio link monitoring configurations dependent upon an operational state of HARQ processes, techniques described herein may enable efficient determination of radio link failures and/or beam failures in the context of NTNs over at least a duration that HARQ processes are disabled. Moreover, by enabling multiple radio link monitoring configurations, the wireless communications system 200 may support improved flexibility and responsiveness for NTN communications.

Figure 3:
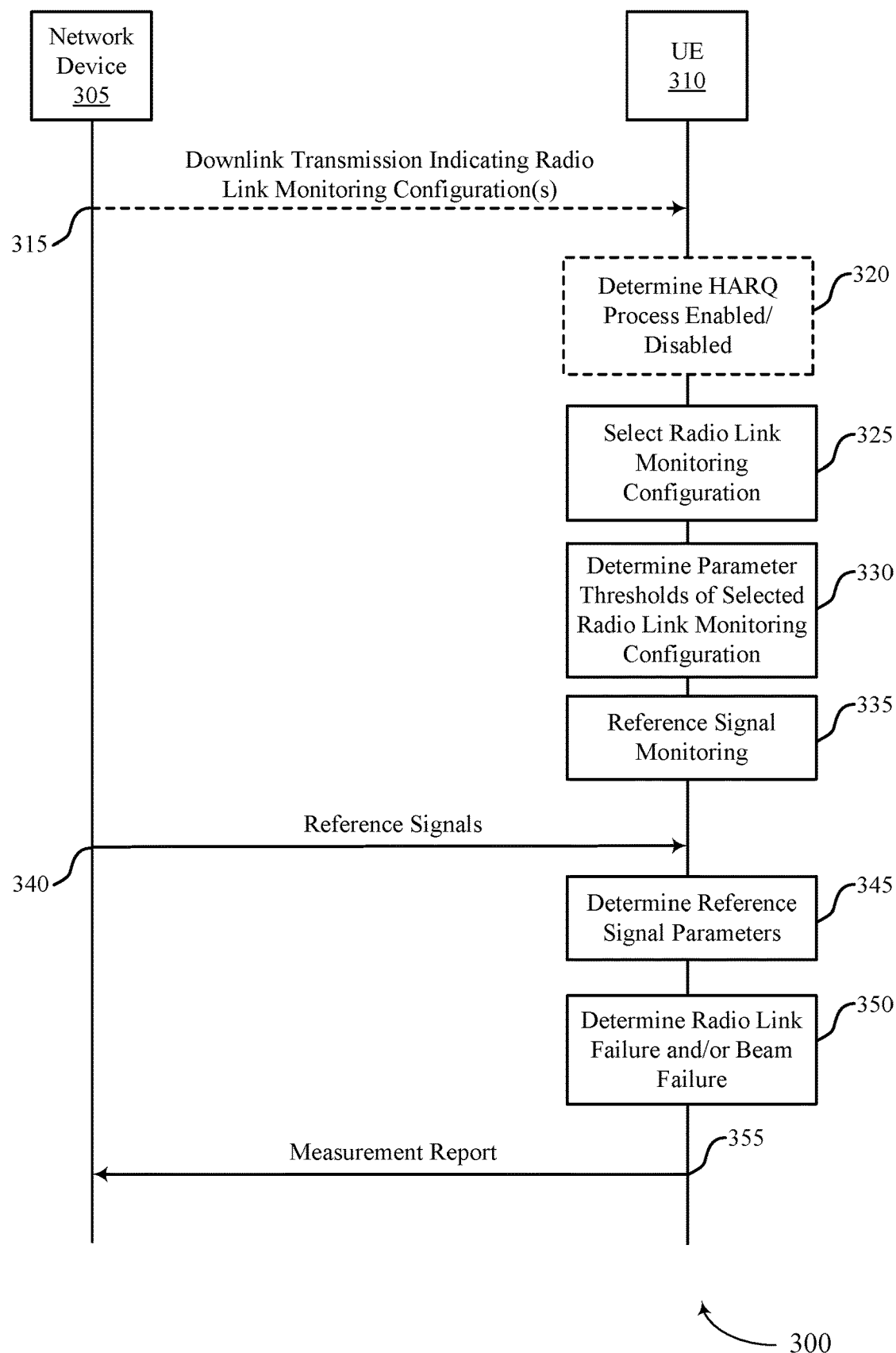
FIG. 3 illustrates an example of a process flow that supports techniques for determining beam failure or radio link failure in accordance with aspects of the present disclosure.

FIG. 3 illustrates an example of a process flow 300 that supports techniques for determining beam failure or radio link failure in accordance with aspects of the present disclosure. In some examples, the process flow 300 may implement, or be implemented by, aspects of wireless communications systems 100 or 200. For example, process flow 300 may include a network device 305, which may refer to a satellite 120, a combination of a satellite 120 and a gateway 210, or a base station 105, as described with reference the FIGS. 1 and 2. In this regard, the network device 305 may be regarded as a node of a wireless communications system (e.g., wireless communications system 100 or 200). The process flow 300 may also include a UE 310, which may be an example of a UE 115 described with reference to FIGS. 1 and 2.

At 315, the network device 305 may transmit, and the UE 310 may receive, a downlink transmission indicating one or more radio link monitoring configurations. In this regard, the downlink transmission may indicate a first radio link monitoring configuration associated with radio link monitoring over at least a duration that HARQ processes are enabled, a second radio link monitoring configuration associated with radio link monitoring over at least a duration that HARQ processes are disabled, or both. Additionally or alternatively, the downlink transmission may indicate a third radio link monitoring configuration (e.g., default radio link monitoring configuration), as will be discussed in further detail herein.

In some cases, the downlink transmission may be configured to dynamically indicate for the UE 310 to switch from one radio link monitoring configuration to another. For example, in some cases, the network device 305 may dynamically signal (e.g., via the downlink transmission) for the UE 310 transition from a default radio link monitoring configuration (e.g., a first radio link monitoring configuration, or a third radio link monitoring configuration) to the second radio link monitoring configuration. In such cases, the downlink transmission at 315 may include an indication of the second radio link monitoring configuration. In this example, the downlink transmission may include, but is not limited to, an RRC message, a MAC-CE message, or both.

Additionally or alternatively, the network device 305 may configure the UE 310 with multiple radio link monitoring configurations. For example, the network device 305 (e.g., node of a wireless communications system) may transmit a downlink transmission including an indication of a first radio link monitoring configuration for radio link monitoring at the UE 310 over at least a duration that a HARQ process is enabled, an indication of a second radio link monitoring configuration for radio link monitoring at the UE 310 over at least a duration that a HARQ process is disabled, or both. In this example, the downlink transmission may include, but is not limited to, an RRC message, an SIB message, or both.

At 320, the UE 310 may determine whether a HARQ process is enabled or disabled at the UE 310. In some aspects, the UE 310 may determine whether the HARQ process is enabled or disabled based on receiving the downlink transmission at 315. For example, in cases where the UE 310 is configured (e.g., via RRC signaling, SIB signaling, or both) with a first radio link monitoring configuration and a second radio link monitoring configuration, the UE 310 may determine whether the HARQ process is enabled or disabled such that the UE 310 may determine which respective radio link monitoring configuration should be used.

At 325, the UE 310 may select a radio link monitoring configuration. In some examples, the UE 310 may select a radio link monitoring configuration from the first radio link monitoring configuration and the second radio link monitoring configuration. Specifically, the UE 310 may select a radio link monitoring configuration from a first radio link monitoring configuration associated with radio link monitoring over at least a duration that a HARQ process is enabled, and the second radio link monitoring configuration associated with radio link monitoring over at least a duration that the HARQ process is disabled. In some aspects, the UE 310 may select a radio link monitoring configuration based on receiving the downlink transmission indicating the one or more radio link monitoring configurations at 315, determining whether the HARQ process is enabled or disabled at 320, or both. For example, the UE 310 may select the second radio link monitoring configuration at 325 based on determining that the HARQ process is disabled at 320. By way of another example, the UE 310 may select the first radio link monitoring configuration at 325 based on determining that the HARQ process is enabled at 320.

In some examples, as will be discussed in further detail herein, the UE 310 may be configured with, and may select, a "default" radio link monitoring configuration (e.g., a third radio link monitoring configuration). In some aspects, the UE 310 may be configured to utilize the third radio link monitoring configuration in cases where the UE 310 has not been configured with the first and/or second radio link monitoring configurations. Additionally or alternatively, the UE 310 may be configured to utilize the third radio link monitoring configuration in cases where the UE 310 has not received an explicit indication to utilize the first and/or second radio link monitoring configurations. In this regard, the UE 310 may be configured to perform radio link failure detection procedures, beam failure detection procedures, or both, according to the third radio link monitoring configuration in cases where the UE 310 has not received an indication to utilize the first and/or second radio link monitoring configurations. Accordingly, in some cases, the UE 310 may select a radio link monitoring configuration at 325 from a "default" radio link monitoring configuration (e.g., third radio link monitoring configuration), the first radio link monitoring configuration associated with HARQ enabled, and the second radio link monitoring configuration associated with HARQ disabled.

At 330, the UE 310, the network device 305, or both, may determine one or more parameter thresholds associated with the selected radio link monitoring configuration. In this regard, the UE 310 and/or the network device 305 may determine one or more parameter thresholds associated with the first radio link monitoring configuration, the second radio link monitoring configuration, the third radio link monitoring configuration (e.g., default radio link monitoring configuration), or any combination thereof. In some aspects, the UE 310 and/or the network device 305 may determine the parameter thresholds based on receiving/transmitting the downlink transmission at 315, determining whether the HARQ process is enabled or disabled at 320, selecting the radio link configuration at 325, or any combination thereof.

In some aspects, parameter thresholds may be defined relative to a hypothetical (e.g., ideal) downlink transmission (e.g., physical downlink control channel (PDCCH) transmission) with a given configuration. For example, a BLER threshold of "10%" may correspond to a 10% BLER of a hypothetical downlink transmission with a downlink control information (DCI) format 1_0, aggregation level 8, and 2-symbol CORESET. Similarly, a BLER threshold of "5%" may correspond to a 5% BLER of the same hypothetical downlink transmission. Accordingly, for the purposes of the present disclosure, parameter thresholds (e.g., BLER thresholds) associated with the respective radio link monitoring configurations may be defined relative to a hypothetical downlink transmissions, where a 5% BLER threshold is considered to be less than (e.g., more stringent) than a 10% BLER threshold.

By way of another example, the UE 310 may determine a first BLER threshold associated with the first radio link monitoring configuration, and a second BLER threshold associated with the second radio link monitoring configuration. In this example, the first BLER threshold may be associated with a first hypothetical PDCCH with a configuration including a DCI format 1_0, an aggregation level 8, a 2-symbol CORESET, a ratio of hypothetical PDCCH energy to secondary synchronization signal (SSS) energy of 4 dB, or any combination thereof. Comparatively, the second BLER threshold may be associated with a second hypothetical PDCCH with a configuration including a DCI format 1_0, an aggregation level 16, a 3-symbol CORESET, a ratio of hypothetical PDCCH energy to SSS energy of 8 dB, or any combination thereof. In this example, the second BLER threshold associated with the second radio link monitoring configuration may be less than the first BLER threshold, and the hypothetical PDCCH associated with the second BLER threshold may be more robust to degradation in the wireless channel as compared to the first BLER threshold.

In some aspects, the second radio link monitoring configuration may be associated with a different set of parameter thresholds as compared to the first radio link monitoring configuration, the third radio link monitoring configuration, or both. Moreover, each respective radio link monitoring configuration may be associated with different sets of parameter thresholds for radio link failure detection procedures and beam failure detection procedures. In this regard, in some cases, each of the first, second, and third radio link monitoring configurations may include a first set of parameter thresholds (e.g., BLER thresholds) for determining beam failures via beam failure detection procedures, and a second set of parameters for determining radio link failures via radio link failure detection procedures.

For example, in the context of beam failure detection procedures, the first radio link monitoring configuration may include a first BLER threshold, and the second radio link monitoring configuration may include a second BLER threshold which is less than the first BLER threshold. For instance, the first BLER threshold of the first radio link monitoring configuration may correspond to a 10% BLER of a hypothetical downlink transmission (e.g., PDCCH transmission) with a given configuration (e.g., DCI format 1_0, aggregation level 8, 2-symbol CORESET). In this example, the second BLER threshold of the second radio link monitoring configuration may correspond to a 0.001% BLER (e.g., $10^{-3}$ BLER) or a 0.00001% BLER (e.g., $10^{-5}$ BLER) of the hypothetical downlink transmission, as illustrated in Table 1 below.

TABLE 1

BLER Thresholds for Beam Failure Detection Procedures

| Radio Link Monitoring Configuration | BLER Threshold |
|---|---|
| First Radio Link Monitoring Configuration (HARQ Enabled) | 10% |
| Second Radio Link Monitoring Configuration (HARQ Disabled) | 0.001% ($10^{-3}$), or 0.00001% ($10^{-5}$) |

As shown in Table 1 above, the second BLER threshold (e.g., 0.001% ($10^{-3}$), or 0.00001% ($10^{-5}$)) associated with the second radio link monitoring configuration may be less than the first BLER threshold associated with the first radio link monitoring configuration. In this regard, the second BLER threshold may be more stringent than the first BLER threshold, such that the second radio link monitoring configuration may be configured to determine a beam failure with lower BLER values as compared to the first radio link monitoring configuration.

Similarly, the UE 310 may determine parameter thresholds for the first radio link configuration, the second radio link configuration, or both, in the context of radio link failure detection procedures. For example, in the context of radio link failure detection procedures, each of the first radio link monitoring configuration, the second radio link monitoring configuration, and a third radio link monitoring configuration may include a BLER threshold (e.g., $BLER_{in}$ threshold) associated with in-sync detection (e.g., in-sync detection thresholds), and BLER threshold (e.g., $BLER_{out}$ threshold) associated with out-of-sync detection (e.g., out-of-sync detection thresholds), as shown in Table 2 below.

TABLE 2

BLER Thresholds for Radio Link Failure Detection Procedures

| Parameter/ Index | Radio Link Monitoring Configuration | $BLER_{out}$ | $BLER_{in}$ |
|---|---|---|---|
| 0 | Default (Third) Radio Link Monitoring Configuration | 10% | 2% |
| 1 | First Radio Link Monitoring Configuration (HARQ Enabled) | 1% | 0.2% |
| 2 | Second Radio Link Monitoring Configuration (HARQ Disabled) | 0.1% | 0.02% |

As shown in Table 2, the UE 310 may determine a first BLER threshold (e.g., $BLER_{out}$=1%) and a second BLER threshold (e.g., $BLER_{in}$=0.2%) associated with the first radio link monitoring configuration. Additionally, the UE 310 may determine a third BLER threshold (e.g., $BLER_{out}$=0.1%) and a second BLER threshold (e.g., $BLER_{in}$=0.02%) associated with the second radio link monitoring configuration. In this example, the first BLER threshold and the third BLER threshold may include out-of-sync detection thresholds (e.g., $BLER_{out}$ thresholds), while the second BLER threshold and the fourth BLER threshold may include in-sync detection thresholds (e.g., $BLER_{in}$ thresholds). Moreover, each of the BLER thresholds may be associated with a radio link failure detection procedure at the UE 310.

In cases where the UE 310 selects the third radio link monitoring configuration (e.g., default radio link monitoring configuration), the UE 310 may determine a $BLER_{out}$ threshold (e.g., $BLER_{out}$=10%) and a BLER threshold (e.g., $BLER_{in}$=2%) associated with the third radio link monitoring configuration.

In some aspects, as shown in Table 2, each of the BLER thresholds associated with the second radio link monitoring threshold may be less than the corresponding BLER thresholds associated with the first radio link monitoring configuration and the third radio link monitoring configuration. For example, the first BLER threshold (e.g., $BLER_{out}$=1%) associated with the first ratio link monitoring configuration may be greater than the third BLER threshold (e.g., $BLER_{out}$=0.1%) associated with the second radio link monitoring configuration. Similarly, the second BLER threshold (e.g., $BLER_{in}$=0.2%) associated with the first ratio link monitoring configuration may be greater than the fourth BLER threshold (e.g., $BLER_{in}$=0.02%) associated with the second radio link monitoring configuration.

In some examples, the first radio link monitoring configuration, the second radio link monitoring configuration, the third radio link monitoring configuration, or any combination thereof, may be associated with one or more "intermediate" parameter thresholds. The intermediate parameter thresholds may be used to determine radio link failures during the radio link monitoring detection procedures. For example, one or more of the first, second, or third radio link monitoring configurations may include an intermediate BLER threshold (e.g., $BLER_{mid}$ threshold), as shown in Table 3 below:

TABLE 3

BLER Thresholds for Radio Link Failure Detection Procedures

| Parameter/ Index | Radio Link Monitoring Configuration | $BLER_{out}$ | $BLER_{mid}$ | $BLER_{in}$ |
|---|---|---|---|---|
| 0 | Default (Third) Radio Link Monitoring Configuration | 10% | 5% | 2% |
| 1 | First Radio Link Monitoring Configuration (HARQ Enabled) | 1% | 0.5% | 0.2% |
| 2 | Second Radio Link Monitoring Configuration (HARQ Disabled) | 0.1% | 0.05% | 0.02% |

As shown in Table 3, the first radio link monitoring configuration may include an intermediate BLER threshold $BLER_{mid}$=0.5% (e.g., a fifth BLER threshold), the second radio link monitoring configuration may include an intermediate BLER threshold $BLER_{mid}$=0.05% (e.g., a sixth BLER threshold), and the third radio link monitoring configuration may include an intermediate BLER threshold $BLER_{mid}$=5%. As shown in Table 3, each of the $BLER_{mid}$ thresholds may be less than the $BLER_{out}$ threshold and greater than the $BLER_{in}$ threshold of the respective radio link monitoring configuration. In some aspects, each of the respective $BLER_{mid}$ thresholds may include out-of-sync detection thresholds associated with radio link failure detection procedures at the UE 310. In this regard, the UE 310 may additionally determine or identify the respective intermediate BLER threshold associated with the radio link monitoring configuration selected at 325.

At 335, the UE 310 may perform reference signal monitoring on reference signals transmitted by the network device 305. In this regard, the UE 310 may monitor one or more reference signals using (e.g., according to) the selected radio link monitoring configuration. In some aspects, the UE 310 may monitor the reference signals based on based on receiving the downlink transmission at 315, determining whether the HARQ process is enabled or disabled at 320, selecting the radio link configuration at 325, determining the parameter thresholds of the selected radio link monitoring configuration, or any combination thereof.

At 340, the network device 305 may transmit, and the UE 310 may receive, one or more reference signals. In some examples, the reference signals transmitted/received at 340 may include examples of the reference signals 245 illustrated in FIG. 2. In some aspects, the network device 305 may transmit, and the UE 310 may receive, the reference signals at 340 based on transmitting/receiving the downlink transmission at 315, determining whether the HARQ process is enabled or disabled at 320, selecting the radio link configuration at 325, determining the parameter thresholds of the selected radio link monitoring configuration, monitoring the reference signals at 335, or any combination thereof.

At 345, the UE 310 may determine one or more reference signal parameters associated with the one or more reference signals (e.g., reference signals 245 illustrated in FIG. 2), one or more beams (e.g., beams 230 illustrated in FIG. 2), or both. In some aspects, the UE 310 may determine reference signal parameters for each respective reference signal, each respective beam, or both. In this regard, the UE 310 may determine the one or more reference signal parameters at 345 based on monitoring the one or more reference signals at 335, receiving the one or more reference signals at 340, or both. The reference signal parameters may include, but are not limited to, BLERs, RSRP values, RSRQ values, SNR values, SINR values, or any combination thereof.

At 350, the UE 310 may determine a radio link failure, a beam failure, or both. In some aspects, the UE 310 may determine the radio link failure and/or the beam failure at 350 based on receiving the downlink transmission at 315, determining whether the HARQ process is enabled or disabled at 320, selecting the radio link configuration at 325, determining the parameter thresholds of the selected radio link monitoring configuration at 330, monitoring the reference signals at 335, receiving the reference signals at 340, determining the reference signal parameters at 345, or any combination thereof. In particular, the UE 310 may determine a radio link failure and/or a beam failure by comparing the determined reference signal parameters to the determined parameter thresholds associated with the selected radio link monitoring configuration.

For example, in the context of a beam failure detection procedure, the UE 310 may determine one or more reference signal parameters (e.g., BLERs) associated with one or more beams. In this example, the UE 310 may compare the one or more BLERs associated with the one or more beams to one or more BLER thresholds associated with the selected radio link monitoring configuration which are used for beam failure detection procedures. For instance, in cases where the UE 310 selects the second radio link monitoring configuration, the UE 310 may determine a BLER associated with a beam, and may determine whether the BLER satisfies a BLER threshold associated with the second radio link monitoring configuration illustrated in Table 1. In some aspects, beam failure detection may be performed in the MAC layer at the UE 310. In this example, the UE 310 may determine a beam failure based on the BLER satisfying the BLER threshold associated with the second radio link monitoring configuration.

In some aspects, the UE 310 may determine a beam failure by counting beam failure instances (BFIs) (e.g., tracking a BFI counter). Specifically, the UE 310 may increment a BFI counter each time the UE 310 determines a parameter associated with a beam (e.g., BLER, RSRP, RSRQ, SNR, SINR) is below a respective parameter threshold (e.g., BLER threshold, $Q_{out\_LR}$ threshold). In some cases, the UE 310 may reset the BFI counter if the BFI counter is not incremented in a given time period (e.g., time period associated with a BeamFailureDetectionTimer), and may determine a beam failure for the beam if the BFI counter associated with the beam satisfies a BFI counter threshold (e.g., beam failure detected if BFI counter≥BFIMaxCount).

By way of another example, in the context of a radio link failure detection procedure, the UE 310 may determine one or more reference signal parameters (e.g., BLERs) associated with the one or more reference signals. In this example, the UE 310 may compare the one or more BLERs associated with the one or more reference signals to one or more BLER thresholds associated with the selected radio link monitoring configuration which are used for radio link failure detection procedures. For instance, in cases where the UE 310 selects the second radio link monitoring configuration, the UE 310 may determine one or more BLERs associated with the one or more reference signals, and may determine whether the one or more BLERs satisfies a BLER threshold associated with the second radio link monitoring configuration illustrated in Tables 1 or 2. In some aspects, beam failure detection may be performed in the RRC layer at the UE 310. In this example, the UE 310 may determine a radio link failure based on the one or more BLERs associated with the one or more reference signals satisfying one or more BLER thresholds associated with the second radio link monitoring configuration.

In some aspects, the UE 310 may determine a radio link failure by comparing the BLERs associated with the respective reference signals to the BLER thresholds (e.g., $BLER_{out}$ threshold, $BLER_{in}$ threshold) associated with the selected radio link monitoring configuration. For example, the UE 310 may generate an out-of-sync indication if a radio link quality (e.g., BLER) for all monitored reference signals is worse than $Q_{out}$ (e.g., generate out-of-sync indication if BLER<$BLER_{out}$ threshold for each reference signal). In this regard, the BLERs for the monitored reference signals may "satisfy" the $BLER_{out}$ threshold if all the BLERs are less than the $BLER_{out}$ threshold. Comparatively, the UE 310 may generate an in-sync indication if the radio link quality for at least one monitored reference signal is better than $Q_{in}$ (e.g., generate in-sync indication if BLER≥BLER$_{in}$ threshold for at least one reference signal). In this regard, the BLERs for the monitored reference signals may "satisfy" the BLER$_{in}$ threshold if at least one BLERs is greater than or equal to the BLER$_{in}$ threshold.

Subsequently, the UE 310 may determine radio link failure based on the generated out-of-sync indications, the generated in-sync indications, one or more timers, or any combination thereof. For example, the UE 310 may initiate a timer (e.g., Timer T310) if an RRC layer of the UE 310 identifies a first quantity (e.g., N310 quantity) of consecutive out-of-sync indications. Conversely, the UE 310 may stop and/or reset the timer (e.g., Timer T310) if the RRC layer of the UE 310 identifies a second quantity (e.g., N311 quantity) of consecutive in-sync indications. In this example, the UE 310 may identify a radio link failure upon an expiration of the timer (e.g., after the timer has run for a predefined duration/expiry time).

In some examples, (e.g., an X7 event condition), the UE 310 may identify a radio link failure by comparing one or more determined parameters associated with the one or more reference signals to an intermediate parameter threshold (e.g., BLER$_{mid}$ threshold) associated with the selected radio link monitoring configuration. For example, in cases where the UE 310 selects the second radio link monitoring configuration, the UE 310 may determine a radio link failure by determining one or more BLERs associated with the one or more reference signals, and comparing the one or more determined BLERs to the BLER$_{mid}$ threshold (e.g., BLER$_{mid}$=0.05%) associated with the second radio link monitoring configuration, as shown in Table 3. In this regard, the UE 310 may determine a radio link failure based on the one or more BLERs satisfying the BLER$_{mid}$ threshold (e.g., BLER$_{mid}$=0.05%) associated with the second radio link monitoring configuration. In some cases, determining a radio link failure and/or beam failure according to an intermediate parameter threshold (e.g., BLER$_{mid}$ threshold) may be considered an "early warning" for a radio link failure detection procedure, a beam failure detection procedure, or both, and may trigger a measurement report.

At 355, the UE 310 may transmit a measurement report (e.g., feedback report, beam measurement report, radio link measurement report) to the network device 305. In some aspects, the measurement report may include an indication of a radio link failure, a beam failure, or both. In this regard, the UE 310 may transmit, and the network device 305 may receive, the measurement report at 355 based on the downlink transmission at 315, determining whether the HARQ process is enabled or disabled at 320, selecting the radio link configuration at 325, determining the parameter thresholds of the selected radio link monitoring configuration at 330, monitoring the reference signals at 335, transmitting/receiving the reference signals at 340, determining the reference signal parameters at 345, determining the radio link failure and/or beam failure at 350, or any combination thereof.

In some aspects, the network device 305, the UE 310, or both, may initiate a beam failure recovery procedure, a radio link failure recovery procedure, a handover procedure, or any combination thereof. For example, the UE 310 and/or the network device 305 may initiate a beam failure recovery procedure and/or a radio link failure recovery procedure based on transmitting/receiving the measurement report at 355.

Techniques described herein may enable more flexible and reliable radio link monitoring. In particular, by configuring and/or signaling the UE 310 to implement multiple radio link monitoring configurations dependent upon an operational state of HARQ processes, techniques described herein may enable efficient determination of radio link failures and/or beam failures in the context of NTNs over at least a duration that HARQ processes are disabled. Moreover, by enabling multiple radio link monitoring configurations, the wireless communications system (e.g., wireless communications system 100 or 200) may support improved flexibility and responsiveness for NTN communications.

Figure 4:
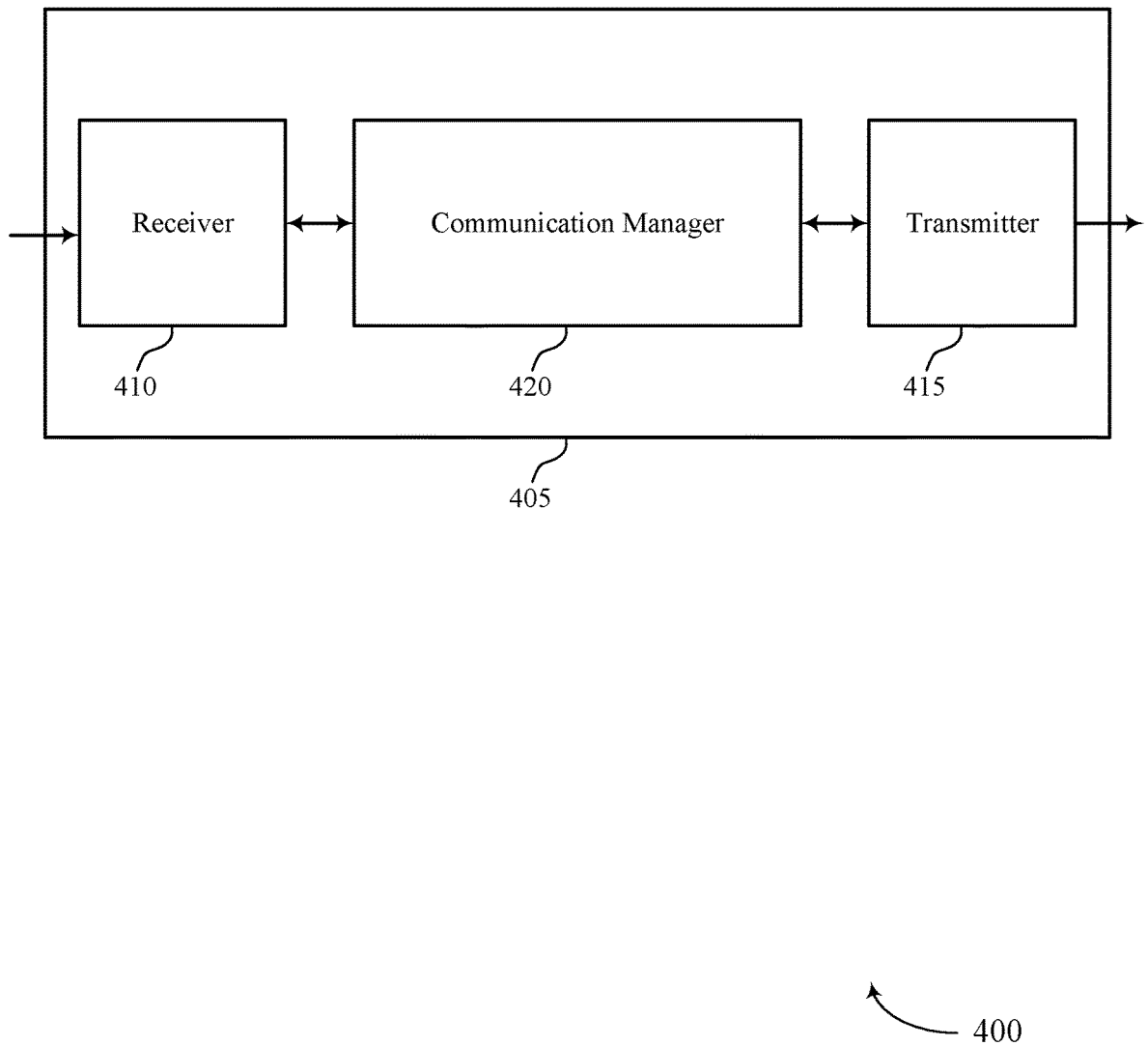
FIGS. 4 and 5 show block diagrams of devices that support techniques for determining beam failure or radio link failure in accordance with aspects of the present disclosure.

FIG. 4 shows a block diagram 400 of a device 405 that supports techniques for determining beam failure or radio link failure in accordance with aspects of the present disclosure. The device 405 may be an example of aspects of a UE 115 as described herein. The device 405 may include a receiver 410, a transmitter 415, and a communication manager 420. The device 405 may also include a processor. Each of these components may be in communication with one another (e.g., via one or more buses).

The receiver 410 may provide a means for receiving information such as packets, user data, or control information associated with various information channels (e.g., control channels, data channels, information related to techniques for determining beam failure or radio link failure). Information may be passed on to other components of the device 405. The receiver 410 may utilize a single antenna or a set of antennas.

The transmitter 415 may provide a means for transmitting signals generated by other components of the device 405. In some examples, the transmitter 415 may be co-located with a receiver 410 in a transceiver module. The transmitter 415 may utilize a single antenna or a set of antennas.

The communication manager 420, the receiver 410, the transmitter 415, or various combinations thereof or various components thereof, may be an example of a means for performing various aspects of techniques for determining beam failure or radio link failure as described herein. The communication manager 420, or its sub-components, may be implemented in hardware (e.g., in communications management circuitry), code (e.g., software or firmware) executed by a processor, or any combination thereof. If implemented in code executed by a processor, the functions of the communication manager 420, or its sub-components may be executed by a general-purpose processor, a digital signal processor (DSP), a central processing unit (CPU), an application-specific integrated circuit (ASIC), a field-programmable gate array (FPGA) or other programmable logic device, discrete gate or transistor logic, discrete hardware components, or any combination thereof designed to perform the functions described in the present disclosure. In some examples, the communication manager 420 may be configured to perform various operations (e.g., receiving, monitoring, transmitting) using or otherwise in cooperation with the receiver 410, the transmitter 415, or both.

The communication manager 420 may support wireless communication at a UE 115 in accordance with examples as disclosed herein. For example, the communication manager 420 may be configured to provide or support a means for selecting a radio link monitoring configuration from a first radio link monitoring configuration associated with radio link monitoring over at least a duration that a HARQ process is enabled, and a second radio link monitoring configuration associated with radio link monitoring over at least a duration that the HARQ process is disabled. The communication manager 420 may be configured to provide or support a means for monitoring one or more reference signals using the selected radio link monitoring configuration. The communication manager 420 may be configured to provide or support a means for determining a radio link failure, a beam failure, or both, based on monitoring the one or more reference signals using the selected radio link monitoring configuration. The communication manager 420 may be configured to provide or support a means for transmitting a measurement report based on determining the radio link failure, the beam failure, or both.

The actions performed by the communication manager 420 as described herein may be implemented to realize one or more potential advantages. For example, enabling radio link monitoring to be performed according to multiple radio link monitoring configurations may improve the efficiency and reliability of radio link failure detection procedures, beam failure detection procedures, or both. Additionally, providing the ability to switch between radio link monitoring configurations may allow the UE 115 (e.g., UE 310) to tailor radio link and/or beam failure detection procedures according to whether HARQ processes are enabled or disabled, thereby improving flexibility in HARQ processes in the context of NTNs and other wireless communications systems.

Based on enabling multiple radio link monitoring configurations, a processor of the UE 115 (e.g., a processor controlling the receiver 410, the communication manager 420, the transmitter 415, etc.) may reduce processing resources used for handover procedures, radio link failure recovery procedures, beam failure recovery procedures, or any combination thereof. For example, by enabling for multiple radio link monitoring configurations, the UE 115 may reduce or prevent radio link failures and/or beam failures, correspondingly reducing a number of times the processor ramps up processing power and turns on processing units to perform radio link failure recovery procedures, beam failure recovery procedures, or both.

Figure 5:
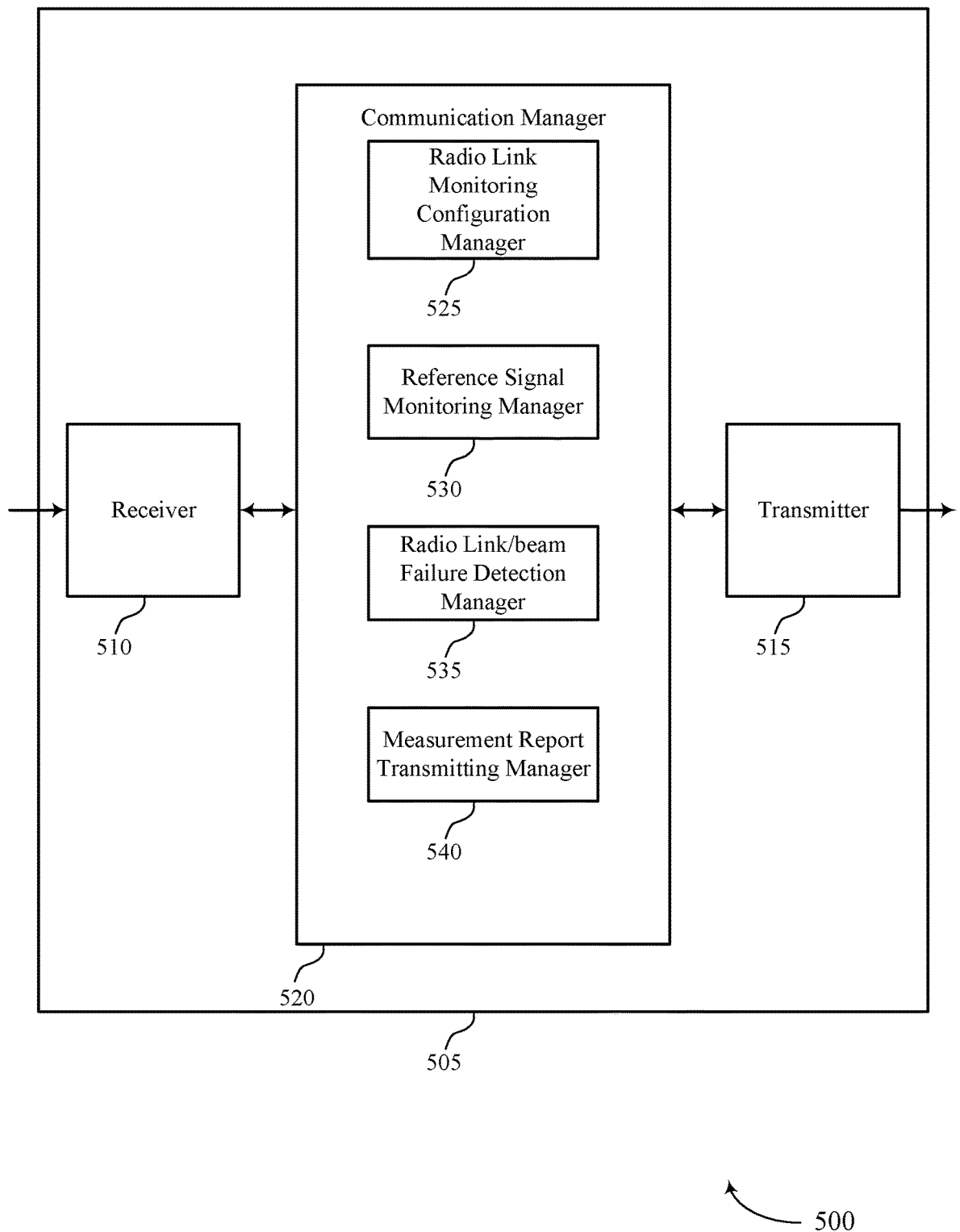

FIG. 5 shows a block diagram 500 of a device 505 that supports techniques for determining beam failure or radio link failure in accordance with aspects of the present disclosure. The device 505 may be an example of aspects of a device 405 or a UE 115 as described herein. The device 505 may include a receiver 510, a transmitter 515, and a communication manager 520. The device 505 may also include a processor. Each of these components may be in communication with one another (e.g., via one or more buses).

The receiver 510 may provide a means for receiving information such as packets, user data, or control information associated with various information channels (e.g., control channels, data channels, information related to techniques for determining beam failure or radio link failure). Information may be passed on to other components of the device 505. The receiver 510 may utilize a single antenna or a set of antennas.

The transmitter 515 may provide a means for transmitting signals generated by other components of the device 505. In some examples, the transmitter 515 may be co-located with a receiver 510 in a transceiver module. The transmitter 515 may utilize a single antenna or a set of antennas.

The device 505, or various components thereof, may be an example of means for performing various aspects of techniques for determining beam failure or radio link failure as described herein. For example, the communication manager 520 may include a radio link monitoring configuration manager 525, a reference signal monitoring manager 530, a radio link/beam failure detection manager 535, a measurement report transmitting manager 540, or any combination thereof. The communication manager 520 may be an example of aspects of a communication manager 420 as described herein. In some examples, the communication manager 520, or various components thereof, may be configured to perform various operations (e.g., receiving, monitoring, transmitting) using or otherwise in cooperation with the receiver 510, the transmitter 515, or both.

The communication manager 520 may support wireless communication at a UE in accordance with examples as disclosed herein. The radio link monitoring configuration manager 525 may be configured to provide or support a means for selecting a radio link monitoring configuration from a first radio link monitoring configuration associated with radio link monitoring over at least a duration that a HARQ process is enabled, and a second radio link monitoring configuration associated with radio link monitoring over at least a duration that the HARQ process is disabled. The reference signal monitoring manager 530 may be configured to provide or support a means for monitoring one or more reference signals using the selected radio link monitoring configuration. The radio link/beam failure detection manager 535 may be configured to provide or support a means for determining a radio link failure, a beam failure, or both, based on monitoring the one or more reference signals using the selected radio link monitoring configuration. The measurement report transmitting manager 540 may be configured to provide or support a means for transmitting a measurement report based on determining the radio link failure, the beam failure, or both.

Figure 6:
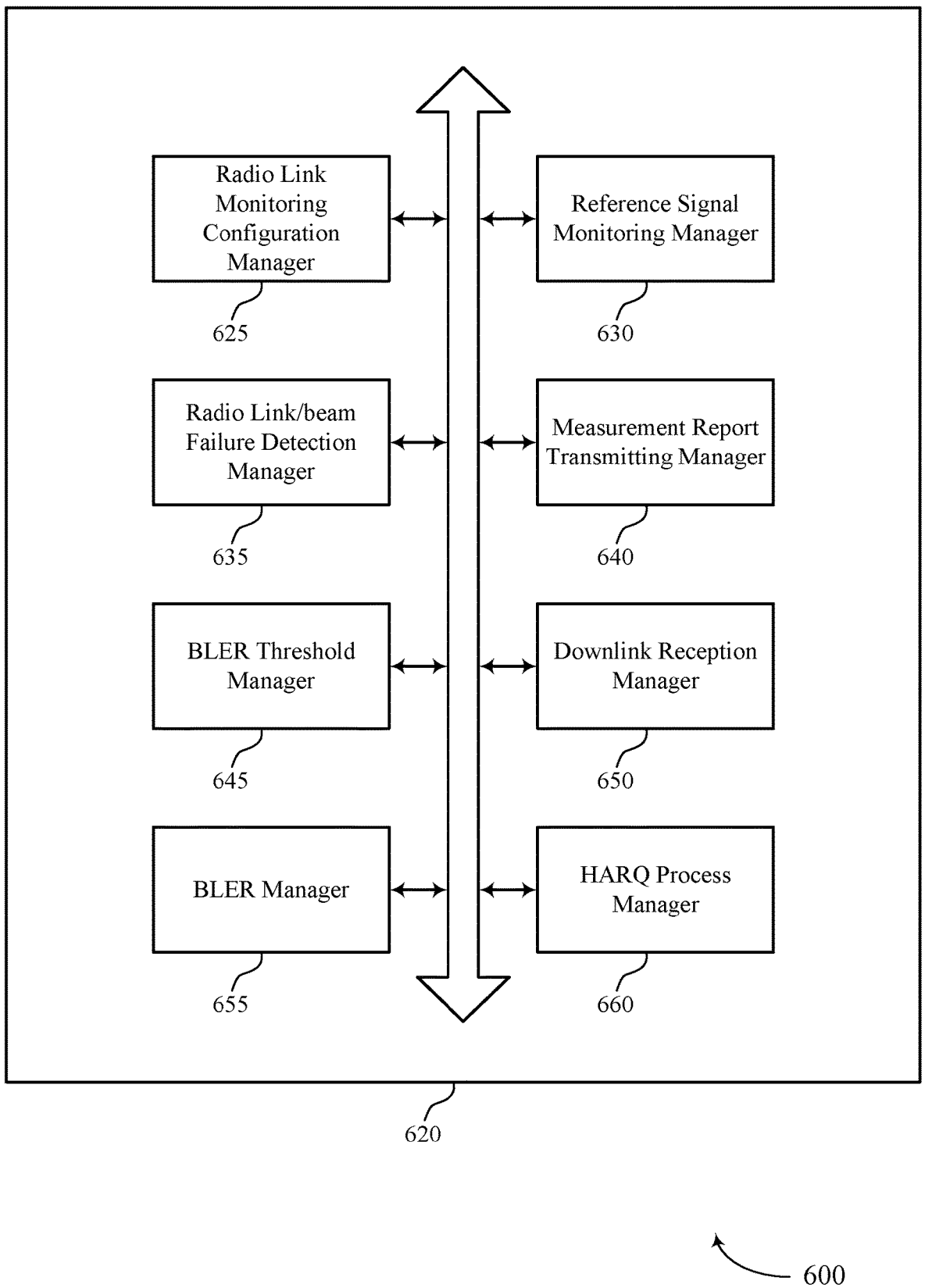
FIG. 6 shows a block diagram of a communication manager that supports techniques for determining beam failure or radio link failure in accordance with aspects of the present disclosure.

FIG. 6 shows a block diagram 600 of a communication manager 620 that supports techniques for determining beam failure or radio link failure in accordance with aspects of the present disclosure. The communication manager 620 may be an example of aspects of a communication manager 420 a communication manager 520, or both, as described herein. The communication manager 620, or various components thereof, may be an example of means for performing various aspects of techniques for determining beam failure or radio link failure as described herein. For example, the communication manager 620 may include a radio link monitoring configuration manager 625, a reference signal monitoring manager 630, a radio link/beam failure detection manager 635, a measurement report transmitting manager 640, a BLER threshold manager 645, a downlink reception manager 650, a BLER manager 655, an HARQ process manager 660, or any combination thereof. Each of these components may communicate, directly or indirectly, with one another (e.g., via one or more buses).

The communication manager 620 may support wireless communication at a UE in accordance with examples as disclosed herein. The radio link monitoring configuration manager 625 may be configured to provide or support a means for selecting a radio link monitoring configuration from a first radio link monitoring configuration associated with radio link monitoring over at least a duration that a HARQ process is enabled, and a second radio link monitoring configuration associated with radio link monitoring over at least a duration that the HARQ process is disabled. The reference signal monitoring manager 630 may be configured to provide or support a means for monitoring one or more reference signals using the selected radio link monitoring configuration. The radio link/beam failure detection manager 635 may be configured to provide or support a means for determining a radio link failure, a beam failure, or both, based on monitoring the one or more reference signals using the selected radio link monitoring configuration. The measurement report transmitting manager 640 may be configured to provide or support a means for transmitting a measurement report based on determining the radio link failure, the beam failure, or both.

In some examples, the BLER threshold manager 645 may be configured to provide or support a means for determining a first BLER threshold and a second BLER threshold associated with the first radio link monitoring configuration, the first BLER threshold including a first in-sync detection threshold and the second BLER threshold including a first out-of-sync detection threshold. In some examples, the BLER threshold manager 645 may be configured to provide or support a means for determining a third BLER threshold and a fourth BLER threshold associated with the second radio link monitoring configuration, the third BLER threshold including a second in-sync detection threshold and the fourth BLER threshold including a second out-of-sync detection threshold, where the first BLER threshold, the second BLER threshold, the third BLER threshold, and the fourth BLER threshold are associated with a radio link failure detection procedure at the UE.

In some examples, the first BLER threshold and the third BLER threshold each include a $BLER_{in}$ threshold. In some examples, the second BLER threshold and the fourth BLER threshold each include a $BLER_{out}$ threshold. In some examples, the first BLER threshold is greater than the third BLER threshold. In some examples, the second BLER threshold is greater than the fourth BLER threshold.

In some examples, the radio link monitoring configuration manager 625 may be configured to provide or support a means for selecting the second radio link monitoring configuration. In some examples, the BLER manager 655 may be configured to provide or support a means for determining one or more BLERs associated with the one or more reference signals based on monitoring the one or more reference signals using the second radio link monitoring configuration. In some examples, the BLER threshold manager 645 may be configured to provide or support a means for determining that the one or more BLERs satisfy the third BLER threshold, the fourth BLER threshold, or both, where the determining of the radio link failure, the beam failure, or both, is based on determining the one or more BLERs satisfy the third BLER threshold, the fourth BLER threshold, or both.

In some examples, the radio link monitoring configuration manager 625 may be configured to provide or support a means for selecting the first radio link monitoring configuration. In some examples, the BLER threshold manager 645 may be configured to provide or support a means for determining a fifth BLER threshold associated with the first radio link monitoring configuration, the fifth BLER threshold less than the second BLER threshold and greater than the first BLER threshold, the fifth BLER threshold including a third out-of-sync detection threshold associated with the radio link failure detection procedure at the UE. In some examples, the BLER threshold manager 645 may be configured to provide or support a means for determining that the one or more BLERs satisfy the fifth BLER threshold, where the determining of the radio link failure, the beam failure, or both, is based on determining the one or more BLERs satisfy the fifth BLER threshold.

In some examples, the radio link monitoring configuration manager 625 may be configured to provide or support a means for selecting the second radio link monitoring configuration. In some examples, the BLER threshold manager 645 may be configured to provide or support a means for determining a fifth BLER threshold associated with the second radio link monitoring configuration, the fifth BLER threshold less than the fourth BLER threshold and greater than the third BLER threshold, the fifth BLER threshold including a third out-of-sync detection threshold associated with the radio link failure detection procedure at the UE. In some examples, the BLER threshold manager 645 may be configured to provide or support a means for determining that the one or more BLERs satisfy the fifth BLER threshold, where the determining of the radio link failure, the beam failure, or both, is based on determining the one or more BLERs satisfy the fifth BLER threshold.

In some examples, the downlink reception manager 650 may be configured to provide or support a means for receiving, from a node of a wireless communications system, a downlink transmission including an indication of the second radio link monitoring configuration, where the selecting of the radio link monitoring configuration from the set that includes the first radio link monitoring configuration and the second radio link monitoring configuration is based on receiving the indication. In some examples, the downlink transmission may include an RRC message, a MAC-CE message, or both.

In some examples, the downlink reception manager 650 may be configured to provide or support a means for receiving, from a node of a wireless communications system, downlink transmission including an indication of the first radio link monitoring configuration and the second radio link monitoring configuration, where the selecting of the radio link monitoring configuration from the set that includes the first radio link monitoring configuration and the second radio link monitoring configuration is based on receiving the downlink transmission. In some examples, the downlink transmission may include an RRC message, a SIB message, or both.

In some examples, the HARQ process manager 660 may be configured to provide or support a means for determining that the HARQ process is disabled based on receiving the downlink transmission. In some examples, the radio link monitoring configuration manager 625 may be configured to provide or support a means for selecting the second radio link monitoring configuration is based on determining that the HARQ process is disabled.

In some examples, the BLER threshold manager 645 may be configured to provide or support a means for determining a second BLER threshold associated with the second radio link monitoring configuration, where a first BLER threshold associated with the first radio link monitoring configuration is greater than the second BLER threshold associated with the second radio link monitoring configuration, the first BLER threshold and the second BLER threshold associated with a beam failure detection procedure at the UE.

In some examples, the radio link monitoring configuration manager 625 may be configured to provide or support a means for selecting the second radio link monitoring configuration. In some examples, the BLER manager 655 may be configured to provide or support a means for determining a BLER associated with a beam based on monitoring the one or more reference signals. In some examples, the BLER threshold manager 645 may be configured to provide or support a means for determining that the BLER satisfies the second BLER threshold associated with the second radio link monitoring configuration, where the determining of the radio link failure, the beam failure, or both has occurred is based on determining that the BLER satisfies the second BLER threshold. In some examples, the one or more reference signals may be received from a node of an NTN.

In some examples, the selecting of the radio link monitoring configuration from the set that including the first radio link monitoring configuration and the second radio link monitoring configuration includes selecting the second radio link monitoring configuration.

In some examples, the BLER manager 655 may be configured to provide or support a means for determining a BLER of a hypothetical physical downlink control channel associated with the selected radio link monitoring configuration, where the determining of the radio link failure, the beam failure, or both has occurred is based on the BLER of the hypothetical physical downlink control channel.

Figure 7:
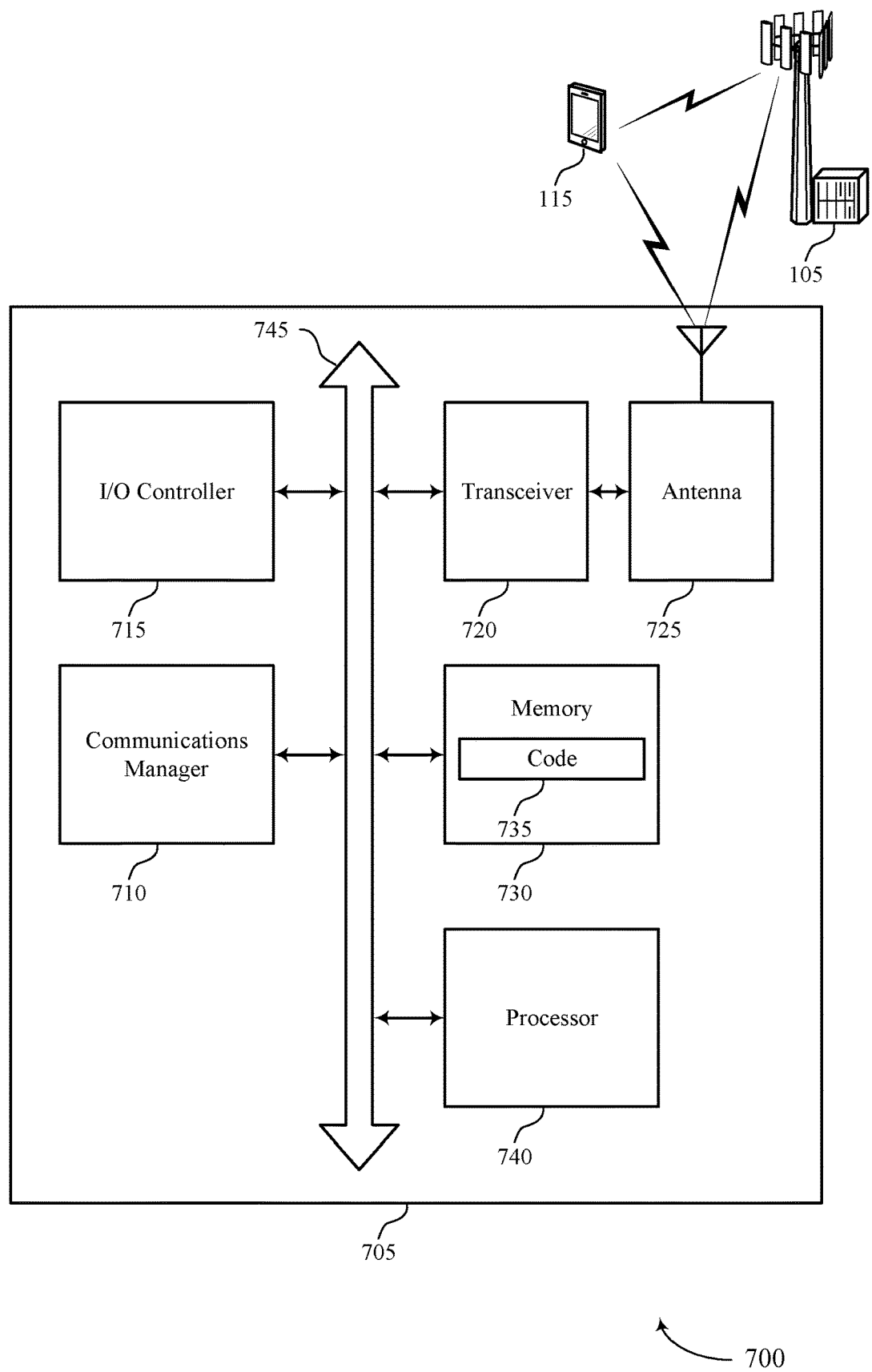
FIG. 7 shows a diagram of a system including a device that supports techniques for determining beam failure or radio link failure in accordance with aspects of the present disclosure.

FIG. 7 shows a diagram of a system 700 including a device 705 that supports techniques for determining beam failure or radio link failure in accordance with aspects of the present disclosure. The device 705 may be an example of or include the components of device 405, device 505, or a UE 115 as described herein. The device 705 may communicate wirelessly with one or more base stations 105, UEs 115, or any combination thereof. The device 705 may include components for bi-directional voice and data communications including components for transmitting and receiving communications, including a communication manager 710, a I/O controller 715, a transceiver 720, an antenna 725, a memory 730, a code 735, and a processor 740. These components may be in electronic communication or otherwise coupled (e.g., operatively, communicatively, functionally, electronically, electrically) via one or more buses (e.g., bus 745).

The I/O controller 715 may manage input and output signals for device 705. The I/O controller 715 may also manage peripherals not integrated into device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with device 705 via the I/O controller 715 or via hardware components controlled by the I/O controller 715.

In some cases, the device 705 may include a single antenna 725. However, in some cases the device may have more than one antenna 725, which may be capable of concurrently transmitting or receiving multiple wireless transmissions. The transceiver 720 may communicate bi-directionally, via the one or more antennas 725, wired, or wireless links as described herein. For example, the transceiver 720 may represent a wireless transceiver and may communicate bi-directionally with another wireless transceiver. The transceiver 720 may also include a modem to modulate the packets and provide the modulated packets to one or more antennas 725 for transmission, and to demodulate packets received from the one or more antennas 725. The transceiver 720, or the transceiver 720 and one or more antennas 725, may be an example of a transmitter 415, a transmitter 515, a receiver 410, a receiver 510, or any combination thereof or component thereof, as described herein.

The memory 730 may include random-access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or other type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for determining beam failure or radio link failure).

The communication manager 710 may support wireless communication at a UE in accordance with examples as disclosed herein. For example, the communication manager 710 may be configured to provide or support a means for selecting a radio link monitoring configuration from a first radio link monitoring configuration associated with radio link monitoring over at least a duration that a HARQ process is enabled, and a second radio link monitoring configuration associated with radio link monitoring over at least a duration that the HARQ process is disabled. The communication manager 710 may be configured to provide or support a means for monitoring one or more reference signals using the selected radio link monitoring configuration. The communication manager 710 may be configured to provide or support a means for determining a radio link failure, a beam failure, or both has occurred based on monitoring the one or more reference signals using the selected radio link monitoring configuration. The communication manager 710 may be configured to provide or support a means for transmitting a measurement report based on determining the radio link failure, the beam failure, or both.

In some examples, the communication manager 710 may be configured to perform various operations (e.g., receiving, monitoring, transmitting) using or otherwise in cooperation with the transceiver 720, the one or more antennas 725, or any combination thereof. Although the communication manager 710 is illustrated as a separate component, in some examples, one or more functions described with reference to the communication manager 710 may be supported by or performed by the processor 740, the memory 730, the code 735, or any combination thereof. For example, the code 735 may include instructions executable by the processor 740 to cause the device 705 to perform various aspects of techniques for determining beam failure or radio link failure as described herein, or the processor 740 and the memory 730 may be otherwise configured to perform or support such operations.

Figure 8:
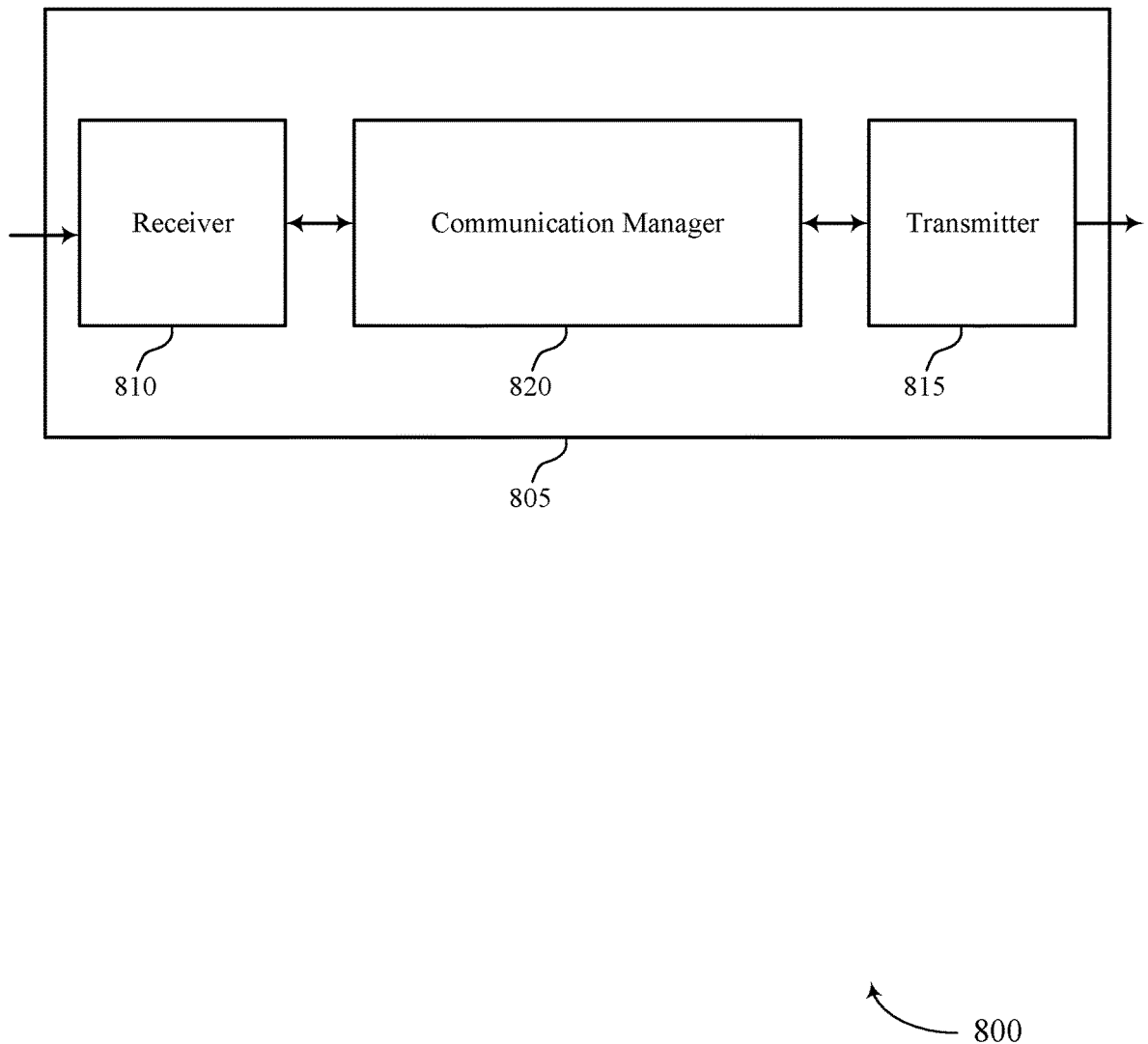
FIGS. 8 and 9 show block diagrams of devices that support techniques for determining beam failure or radio link failure in accordance with aspects of the present disclosure.

FIG. 8 shows a block diagram 800 of a device 805 that supports techniques for determining beam failure or radio link failure in accordance with aspects of the present disclosure. The device 805 may be an example of aspects of a base station 105 as described herein. The device 805 may include a receiver 810, a transmitter 815, and a communication manager 820. The device 805 may also include a processor. Each of these components may be in communication with one another (e.g., via one or more buses).

The receiver 810 may provide a means for receiving information such as packets, user data, or control information associated with various information channels (e.g., control channels, data channels, information related to techniques for determining beam failure or radio link failure). Information may be passed on to other components of the device 805. The receiver 810 may utilize a single antenna or a set of antennas.

The transmitter 815 may provide a means for transmitting signals generated by other components of the device 805. In some examples, the transmitter 815 may be co-located with a receiver 810 in a transceiver module. The transmitter 815 may utilize a single antenna or a set of antennas.

The communication manager 820, the receiver 810, the transmitter 815, or various combinations thereof or various components thereof, may be an example of a means for performing various aspects of techniques for determining beam failure or radio link failure as described herein. The communication manager 820, or its sub-components, may be implemented in hardware (e.g., in communications management circuitry), code (e.g., software or firmware) executed by a processor, or any combination thereof. If implemented in code executed by a processor, the functions of the communication manager 820, or its sub-components may be executed by a general-purpose processor, a DSP, a CPU, an ASIC, an FPGA or other programmable logic device, discrete gate or transistor logic, discrete hardware components, or any combination thereof designed to perform the functions described in the present disclosure. In some examples, the communication manager 820 may be configured to perform various operations (e.g., receiving, monitoring, transmitting) using or otherwise in cooperation with the receiver 810, the transmitter 815, or both.

The communication manager 820 may support wireless communication at a network device in accordance with examples as disclosed herein. For example, the communication manager 820 may be configured to provide or support a means for transmitting, to a UE, a downlink transmission including a first indication of a first radio link monitoring configuration associated with radio link monitoring over at least a duration that a HARQ process is enabled, a second radio link monitoring configuration associated with radio link monitoring over at least a duration that the HARQ process is disabled, or both. The communication manager 820 may be configured to provide or support a means for transmitting, to the UE, one or more reference signals based on the first indication of the first radio link monitoring configuration, the second radio link monitoring configuration, or both. The communication manager 820 may be configured to provide or support a means for receiving, from the UE, a measurement report based on transmitting the one or more reference signals, the measurement report based on the first radio link monitoring configuration, the second radio link monitoring configuration, or both, the measurement report including a second indication of a radio link failure, a beam failure, or both.

The actions performed by the communication manager 820 as described herein may be implemented to realize one or more potential advantages. For example, enabling radio link monitoring to be performed according to multiple radio link monitoring configurations may improve the efficiency and reliability of radio link failure detection procedures, beam failure detection procedures, or both. Additionally, providing the ability to switch between radio link monitoring configurations may allow the base station 105, satellite 120, and/or UE 115 (e.g., UE 310) to tailor radio link and/or beam failure detection procedures according to whether HARQ processes are enabled or disabled, thereby improving flexibility in HARQ processes in the context of NTNs and other wireless communications systems.

Based on enabling multiple radio link monitoring configurations, a processor of the base station 105 and/or satellite 120 (e.g., a processor controlling the receiver 810, the communication manager 820, the transmitter 815, etc.) may reduce processing resources used for handover procedures, radio link recovery failure procedures, beam failure recovery procedures, or any combination thereof. For example, by enabling for multiple radio link monitoring configurations, the base station 105 and/or satellite 120 may reduce or prevent radio link failures and/or beam failures, correspondingly reducing a number of times the processor ramps up processing power and turns on processing units to perform radio link failure recovery procedures, beam failure recovery procedures, or both.

Figure 9:
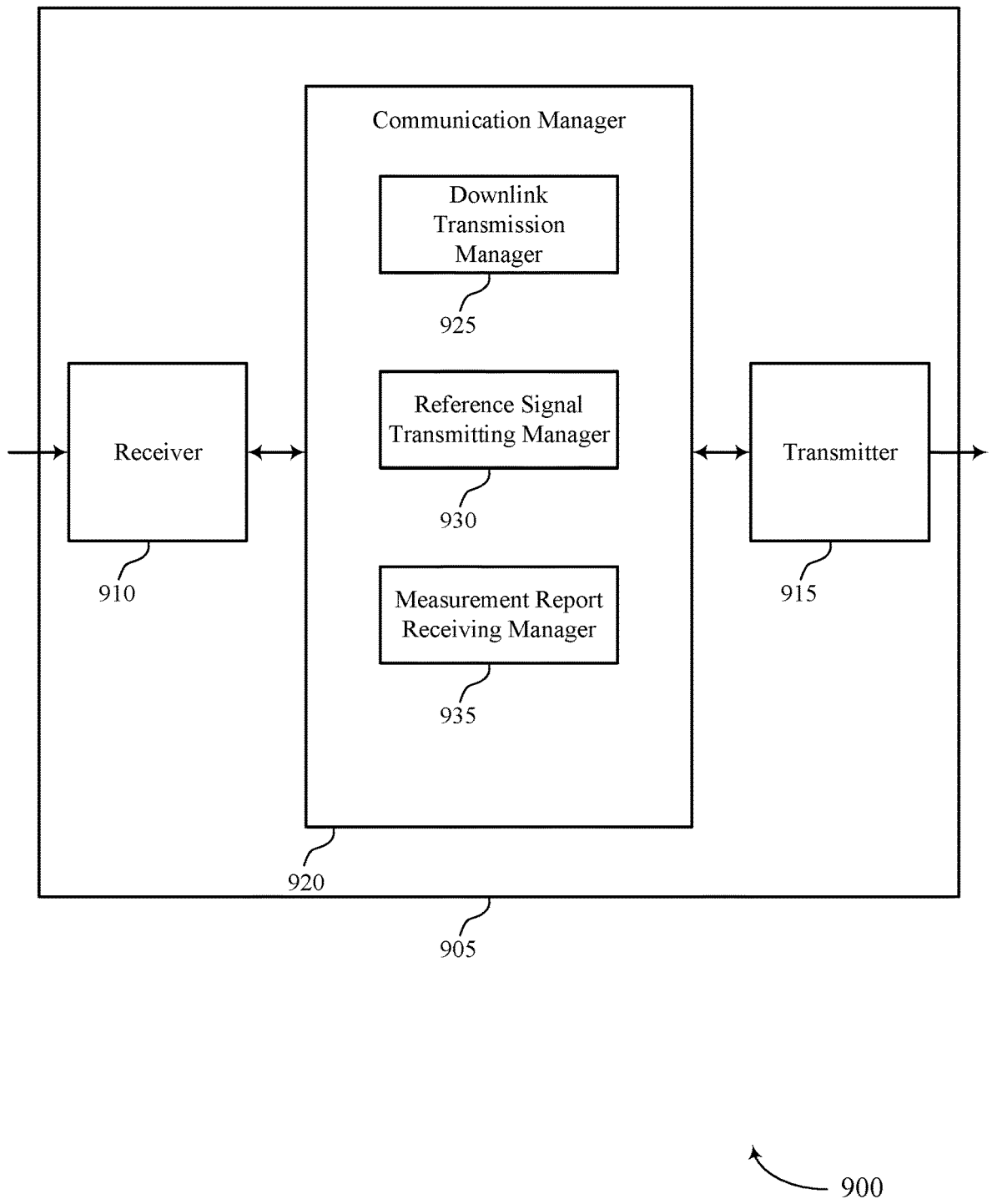

FIG. 9 shows a block diagram 900 of a device 905 that supports techniques for determining beam failure or radio link failure in accordance with aspects of the present disclosure. The device 905 may be an example of aspects of a device 805 or a base station 105 as described herein. The device 905 may include a receiver 910, a transmitter 915, and a communication manager 920. The device 905 may also include a processor. Each of these components may be in communication with one another (e.g., via one or more buses).

The receiver 910 may provide a means for receiving information such as packets, user data, or control information associated with various information channels (e.g., control channels, data channels, information related to techniques for determining beam failure or radio link failure). Information may be passed on to other components of the device 905. The receiver 910 may utilize a single antenna or a set of antennas.

The transmitter 915 may provide a means for transmitting signals generated by other components of the device 905. In some examples, the transmitter 915 may be co-located with a receiver 910 in a transceiver module. The transmitter 915 may utilize a single antenna or a set of antennas.

The device 905, or various components thereof, may be an example of means for performing various aspects of techniques for determining beam failure or radio link failure as described herein. For example, the communication manager 920 may include a downlink transmission manager 925, a reference signal transmitting manager 930, a measurement report receiving manager 935, or any combination thereof. The communication manager 920 may be an example of aspects of a communication manager 820 as described herein. In some examples, the communication manager 920, or various components thereof, may be configured to perform various operations (e.g., receiving, monitoring, transmitting) using or otherwise in cooperation with the receiver 910, the transmitter 915, or both.

The communication manager 920 may support wireless communication at a network device in accordance with examples as disclosed herein. The downlink transmission manager 925 may be configured to provide or support a means for transmitting, to a UE, a downlink transmission including a first indication of a first radio link monitoring configuration associated with radio link monitoring over at least a duration that a HARQ process is enabled, a second radio link monitoring configuration associated with radio link monitoring over at least a duration that the HARQ process is disabled, or both. The reference signal transmitting manager 930 may be configured to provide or support a means for transmitting, to the UE, one or more reference signals based on the first indication of the first radio link monitoring configuration, the second radio link monitoring configuration, or both. The measurement report receiving manager 935 may be configured to provide or support a means for receiving, from the UE, a measurement report based on transmitting the one or more reference signals, the measurement report based on the first radio link monitoring configuration, the second radio link monitoring configuration, or both, the measurement report including a second indication of a radio link failure, a beam failure, or both.

Figure 10:
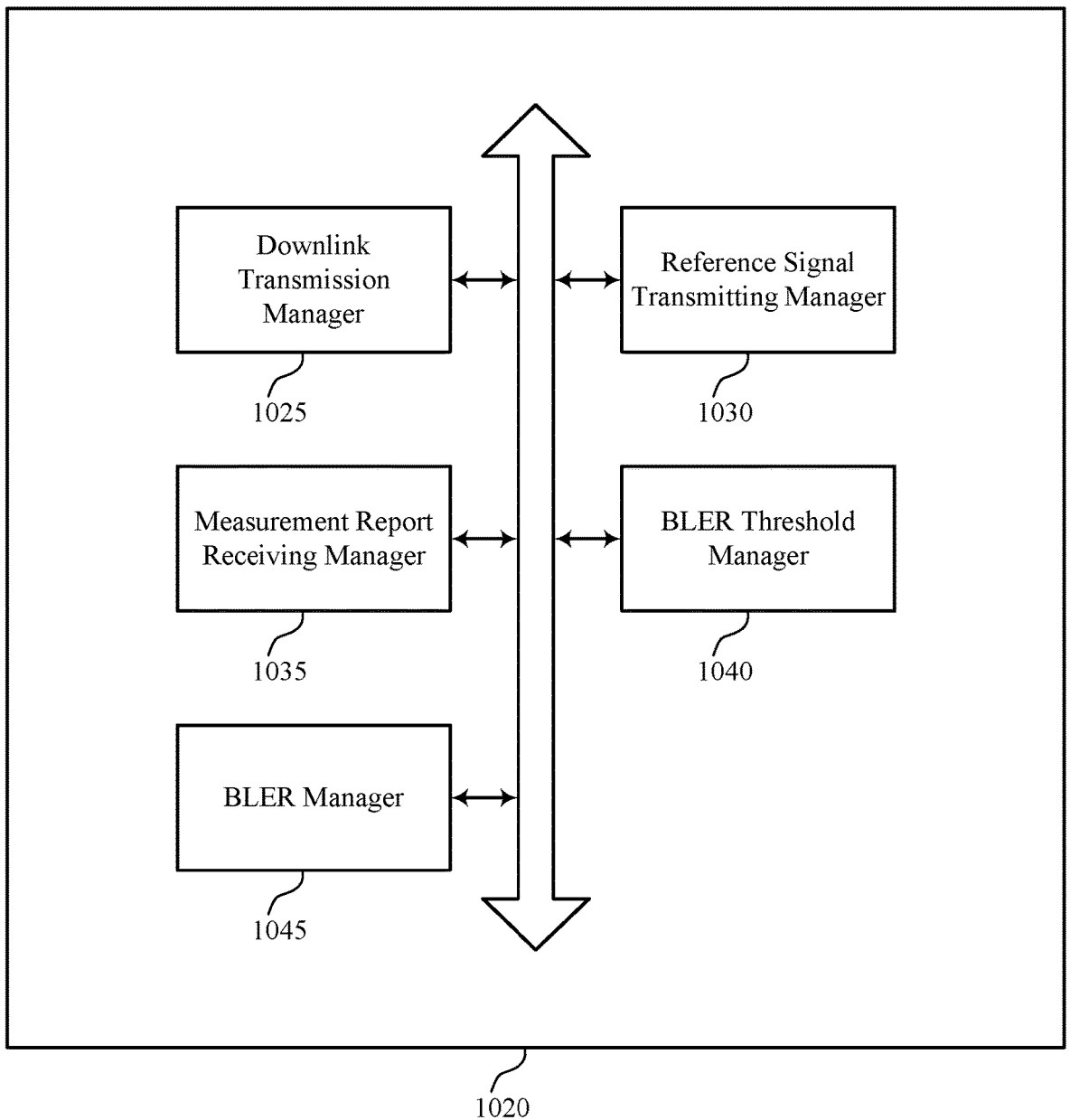
FIG. 10 shows a block diagram of a communication manager that supports techniques for determining beam failure or radio link failure in accordance with aspects of the present disclosure.

FIG. 10 shows a block diagram 1000 of a communication manager 1020 that supports techniques for determining beam failure or radio link failure in accordance with aspects of the present disclosure. The communication manager 1020 may be an example of aspects of a communication manager 820 a communication manager 920, or both, as described herein. The communication manager 1020, or various components thereof, may be an example of means for performing various aspects of techniques for determining beam failure or radio link failure as described herein. For example, the communication manager 1020 may include a downlink transmission manager 1025, a reference signal transmitting manager 1030, a measurement report receiving manager 1035, a BLER threshold manager 1040, a BLER manager 1045, or any combination thereof. Each of these components may communicate, directly or indirectly, with one another (e.g., via one or more buses).

The communication manager 1020 may support wireless communication at a network device in accordance with examples as disclosed herein. The downlink transmission manager 1025 may be configured to provide or support a means for transmitting, to a UE, a downlink transmission including a first indication of a first radio link monitoring configuration associated with radio link monitoring over at least a duration that a HARQ process is enabled, a second radio link monitoring configuration associated with radio link monitoring over at least a duration that the HARQ process is disabled, or both. The reference signal transmitting manager 1030 may be configured to provide or support a means for transmitting, to the UE, one or more reference signals based on the first indication of the first radio link monitoring configuration, the second radio link monitoring configuration, or both. The measurement report receiving manager 1035 may be configured to provide or support a means for receiving, from the UE, a measurement report based on transmitting the one or more reference signals, the measurement report based on the first radio link monitoring configuration, the second radio link monitoring configuration, or both, the measurement report including a second indication of a radio link failure, a beam failure, or both. In some examples, the first indication may indicate the second radio link monitoring configuration. In some examples, the measurement report being based on the second radio link monitoring configuration.

In some examples, the BLER threshold manager 1040 may be configured to provide or support a means for determining a first BLER threshold and a second BLER threshold associated with the first radio link monitoring configuration, the first BLER threshold including a first in-sync detection threshold and the second BLER threshold including a first out-of-sync detection threshold. In some examples, the BLER threshold manager 1040 may be configured to provide or support a means for determining a third BLER threshold and a fourth BLER threshold associated with the second radio link monitoring configuration, the third BLER threshold including a second in-sync detection threshold and the fourth BLER threshold including a second out-of-sync detection threshold, where the first BLER threshold, the second BLER threshold, the third BLER threshold, and the fourth BLER threshold are associated with a radio link failure detection procedure at the UE.

In some examples, the first BLER threshold and the third BLER threshold each include a $BLER_{in}$ threshold. In some examples, the second BLER threshold and the fourth BLER threshold each include a $BLER_{out}$ threshold. In some examples, the first BLER threshold is greater than the third BLER threshold. In some examples, the second BLER threshold is greater than the fourth BLER threshold.

In some examples, the BLER threshold manager 1040 may be configured to provide or support a means for determining a fifth BLER threshold associated with the second radio link monitoring configuration, the fifth BLER threshold greater than the third BLER threshold and less than the fourth BLER threshold, the fifth BLER threshold including a third out-of-sync detection threshold associated with the radio link failure detection procedure at the UE. In some examples, the downlink transmission manager 1025 may be configured to provide or support a means for transmitting, to the UE via the downlink transmission, a third indication of the fifth BLER threshold, where receiving the measurement report is based on the third indication of the fifth BLER threshold. In some examples, the downlink transmission may include a third indication for the UE to perform radio link monitoring via the second radio link monitoring configuration. In some examples, the downlink transmission may include an RRC message, a MAC-CE message, or both. In some examples, the downlink transmission may include an RRC message, a SIB message, or both.

In some examples, the downlink transmission manager 1025 may be configured to provide or support a means for transmitting, to the UE via the downlink transmission, a third indication of the first radio link monitoring configuration, where the downlink transmission further includes a fourth indication for the UE to perform radio link monitoring using the second radio link monitoring configuration over at least a duration that the HARQ process is disabled, and a fifth indication for the UE to perform radio link monitoring using the first radio link monitoring configuration over at least a duration that the HARQ process is enabled.

In some examples, the BLER threshold manager 1040 may be configured to provide or support a means for determining a BLER threshold associated with the second radio link monitoring configuration, where a first BLER threshold associated with the first radio link monitoring configuration is greater than the second BLER threshold associated with the second radio link monitoring configuration, the first BLER threshold and the second BLER threshold associated with a beam failure detection procedure at the UE.

In some examples, the network device may include a node of an NTN.

In some examples, the BLER manager 1045 may be configured to provide or support a means for determining a BLER of a hypothetical physical downlink control channel associated with the selected radio link monitoring configuration, where the measurement report including the indication of the radio link failure, the beam failure, or both, is based on the BLER of the hypothetical physical downlink control channel.

Figure 11:
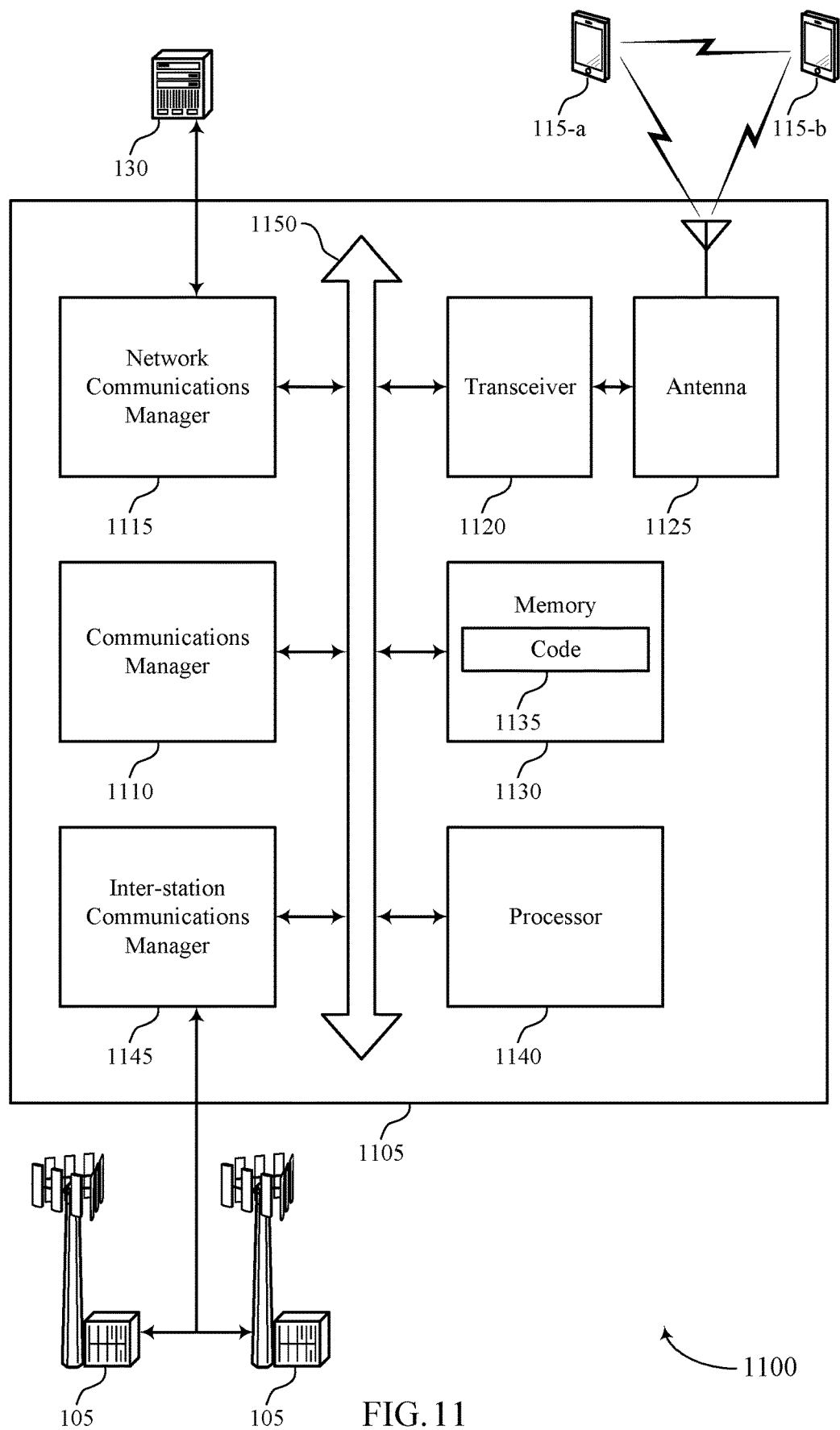
FIG. 11 shows a diagram of a system including a device that supports techniques for determining beam failure or radio link failure in accordance with aspects of the present disclosure.

FIG. 11 shows a diagram of a system 1100 including a device 1105 that supports techniques for determining beam failure or radio link failure in accordance with aspects of the present disclosure. The device 1105 may be an example of or include the components of device 805, device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, including a communication manager 1110, a network communications manager 1115, a transceiver 1120, an antenna 1125, a memory 1130, a code 1135, a processor 1140, and an inter-station communications manager 1145. These components may be in electronic communication or otherwise coupled (e.g., operatively, communicatively, functionally, electronically, electrically) via one or more buses (e.g., bus 1150).

The network communications manager 1115 may manage communications with the core network (e.g., via one or more wired backhaul links). For example, the network communications manager 1115 may manage the transfer of data communications for client devices, such as one or more UEs 115.

In some cases, the device 1105 may include a single antenna 1125. However, in some cases the device may have more than one antenna 1125, which may be capable of concurrently transmitting or receiving multiple wireless transmissions. The transceiver 1120 may communicate bi-directionally, via the one or more antennas 1125, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to one or more antennas 1125 for transmission, and to demodulate packets received from the one or more antennas 1125. The transceiver 1120, or the transceiver 1120 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for determining beam failure or radio link failure).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The communication manager 1110 may support wireless communication at a network device in accordance with examples as disclosed herein. For example, the communication manager 1110 may be configured to provide or support a means for transmitting, to a UE, a downlink transmission including a first indication of a first radio link monitoring configuration associated with radio link monitoring over at least a duration that a HARQ process is enabled, a second radio link monitoring configuration associated with radio link monitoring over at least a duration that the HARQ process is disabled, or both. The communication manager 1110 may be configured to provide or support a means for transmitting, to the UE, one or more reference signals based on the first indication of the first radio link monitoring configuration, the second radio link monitoring configuration, or both. The communication manager 1110 may be configured to provide or support a means for receiving, from the UE, a measurement report based on transmitting the one or more reference signals, the measurement report based on the first radio link monitoring configuration, the second radio link monitoring configuration, or both, the measurement report including a second indication of a radio link failure, a beam failure, or both.

In some examples, the communication manager 1110 may be configured to perform various operations (e.g., receiving, monitoring, transmitting) using or otherwise in cooperation with the transceiver 1120, the one or more antennas 1125, or any combination thereof. Although the communication manager 1110 is illustrated as a separate component, in some examples, one or more functions described with reference to the communication manager 1110 may be supported by or performed by the processor 1140, the memory 1130, the code 1135, or any combination thereof. For example, the code 1135 may include instructions executable by the processor 1140 to cause the device 1105 to perform various aspects of techniques for determining beam failure or radio link failure as described herein, or the processor 1140 and the memory 1130 may be otherwise configured to perform or support such operations.

Figure 12:
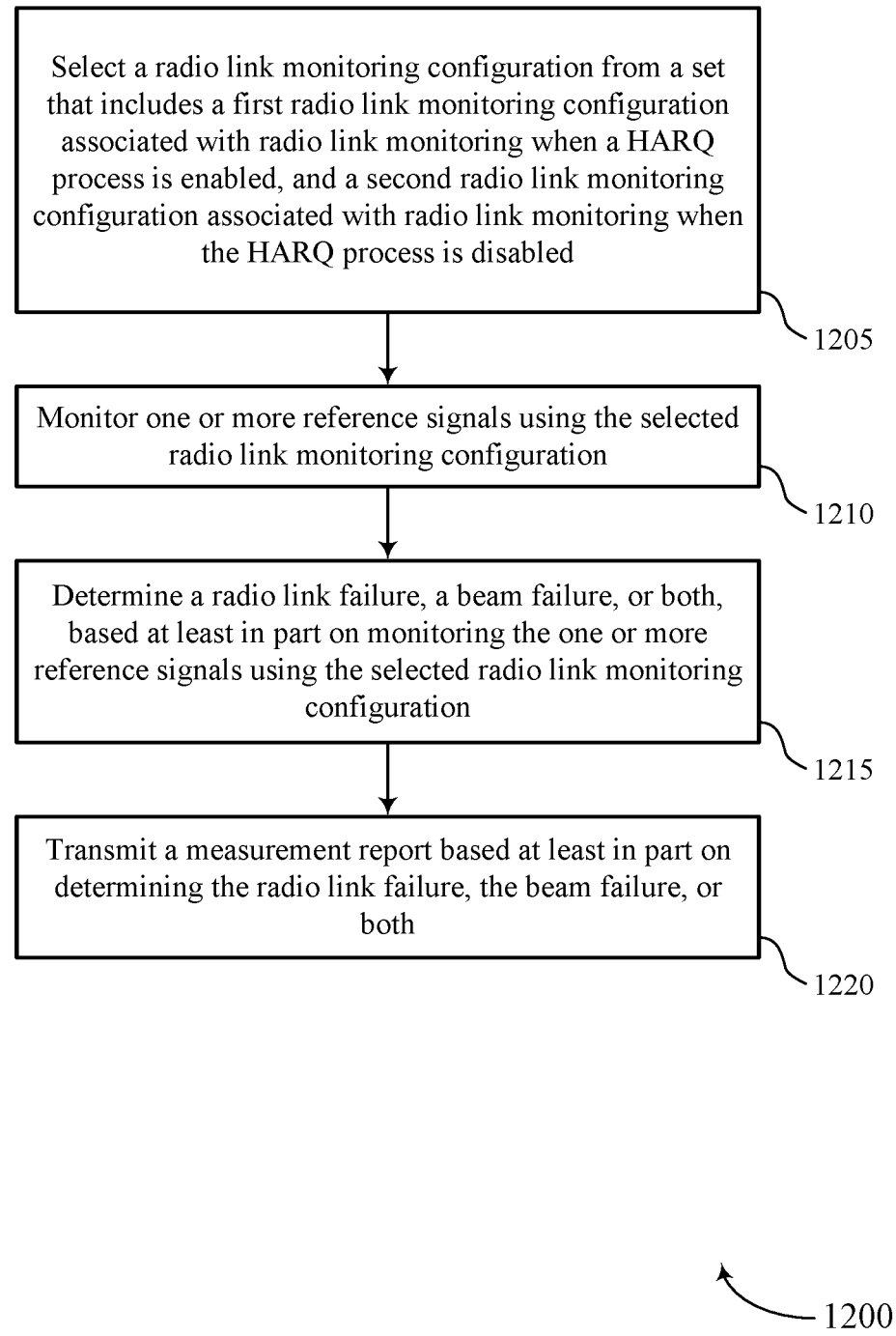
FIGS. 12 through 16 show flowcharts illustrating methods that support techniques for determining beam failure or radio link failure in accordance with aspects of the present disclosure.

FIG. 12 shows a flowchart illustrating a method 1200 for techniques for determining beam failure or radio link failure in accordance with aspects of the present disclosure. The operations of method 1200 may be implemented by a UE or its components as described herein. For example, the operations of method 1200 may be performed by a UE 115 as described with reference to FIGS. 1 through 7. In some examples, a UE may execute a set of instructions to control the functional elements of the device to perform the described functions. Additionally or alternatively, the UE may perform aspects of the described functions using special-purpose hardware.

At 1205, the method may include selecting a radio link monitoring configuration from a first radio link monitoring configuration associated with radio link monitoring over at least a duration that a HARQ process is enabled, and a second radio link monitoring configuration associated with radio link monitoring over at least a duration that the HARQ process is disabled. The operations of 1205 may be performed according to the methods described herein. In some examples, aspects of the operations of 1205 may be performed by a radio link monitoring configuration manager 625 as described with reference to FIG. 6.

At 1210, the method may include monitoring one or more reference signals using the selected radio link monitoring configuration. The operations of 1210 may be performed according to the methods described herein. In some examples, aspects of the operations of 1210 may be performed by a reference signal monitoring manager 630 as described with reference to FIG. 6.

At 1215, the method may include determining a radio link failure, a beam failure, or both has occurred based at least in part on monitoring the one or more reference signals using the selected radio link monitoring configuration. The operations of 1215 may be performed according to the methods described herein. In some examples, aspects of the operations of 1215 may be performed by a radio link/beam failure detection manager 635 as described with reference to FIG. 6.

At 1220, the method may include transmitting a measurement report based at least in part on determining the radio link failure, the beam failure, or both has occurred. The operations of 1220 may be performed according to the methods described herein. In some examples, aspects of the operations of 1220 may be performed by a measurement report transmitting manager 640 as described with reference to FIG. 6.

Figure 13:
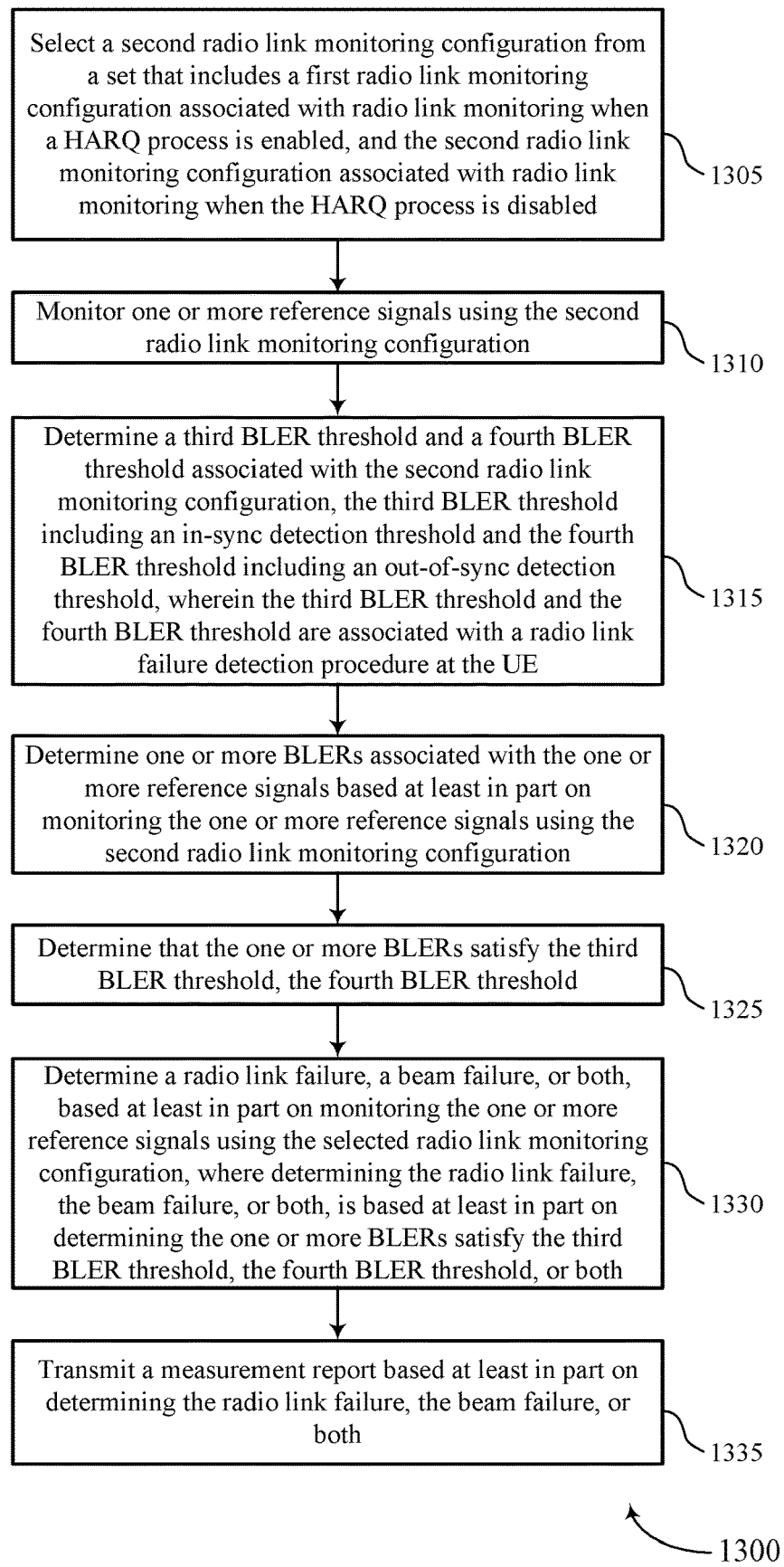

FIG. 13 shows a flowchart illustrating a method 1300 for techniques for determining beam failure or radio link failure in accordance with aspects of the present disclosure. The operations of method 1300 may be implemented by a UE or its components as described herein. For example, the operations of method 1300 may be performed by a UE 115 as described with reference to FIGS. 1 through 7. In some examples, a UE may execute a set of instructions to control the functional elements of the device to perform the described functions. Additionally or alternatively, the UE may perform aspects of the described functions using special-purpose hardware.

At 1305, the method may include selecting a second radio link monitoring configuration from a first radio link monitoring configuration associated with radio link monitoring over at least a duration that a HARQ process is enabled, and the second radio link monitoring configuration associated with radio link monitoring over at least a duration that the HARQ process is disabled. The operations of 1305 may be performed according to the methods described herein. In some examples, aspects of the operations of 1305 may be performed by a radio link monitoring configuration manager 625 as described with reference to FIG. 6.

At 1310, the method may include monitoring one or more reference signals using the second radio link monitoring configuration. The operations of 1310 may be performed according to the methods described herein. In some examples, aspects of the operations of 1310 may be performed by a reference signal monitoring manager 630 as described with reference to FIG. 6.

At 1315, the method may include determining a third BLER threshold and a fourth BLER threshold associated with the second radio link monitoring configuration, the third BLER threshold including an in-sync detection threshold and the second BLER threshold including a first out-of-sync detection threshold. The operations of 1315 may be performed according to the methods described herein. In some examples, aspects of the operations of 1315 may be performed by a BLER threshold manager 645 as described with reference to FIG. 6.

At 1320, the method may include determining one or more BLERs associated with the one or more reference signals based at least in part on monitoring the one or more reference signals using the second radio link monitoring configuration. The operations of 1320 may be performed according to the methods described herein. In some examples, aspects of the operations of 1320 may be performed by a BLER threshold manager 645 as described with reference to FIG. 6.

At 1325, the method may include determining that the one or BLERs satisfy the third BLER threshold, the fourth BLER threshold, or both. The operations of 1325 may be performed according to the methods described herein. In some examples, aspects of the operations of 1325 may be performed by a BLER threshold manager 645 as described with reference to FIG. 6.

At 1330, the method may include determining a radio link failure, a beam failure, or both has occurred based at least in part on monitoring the one or more reference signals using the selected radio link monitoring configuration, where determining the radio link failure, the beam failure, or both has occurred is based on determining that the one or more BLERs satisfy the third BLER threshold, the fourth BLER threshold, or both. The operations of 1330 may be performed according to the methods described herein. In some examples, aspects of the operations of 1330 may be performed by a radio link/beam failure detection manager 635 as described with reference to FIG. 6.

At 1335, the method may include transmitting a measurement report based at least in part on determining the radio link failure, the beam failure, or both has occurred. The operations of 1335 may be performed according to the methods described herein. In some examples, aspects of the operations of 1335 may be performed by a measurement report transmitting manager 640 as described with reference to FIG. 6.

Figure 14:
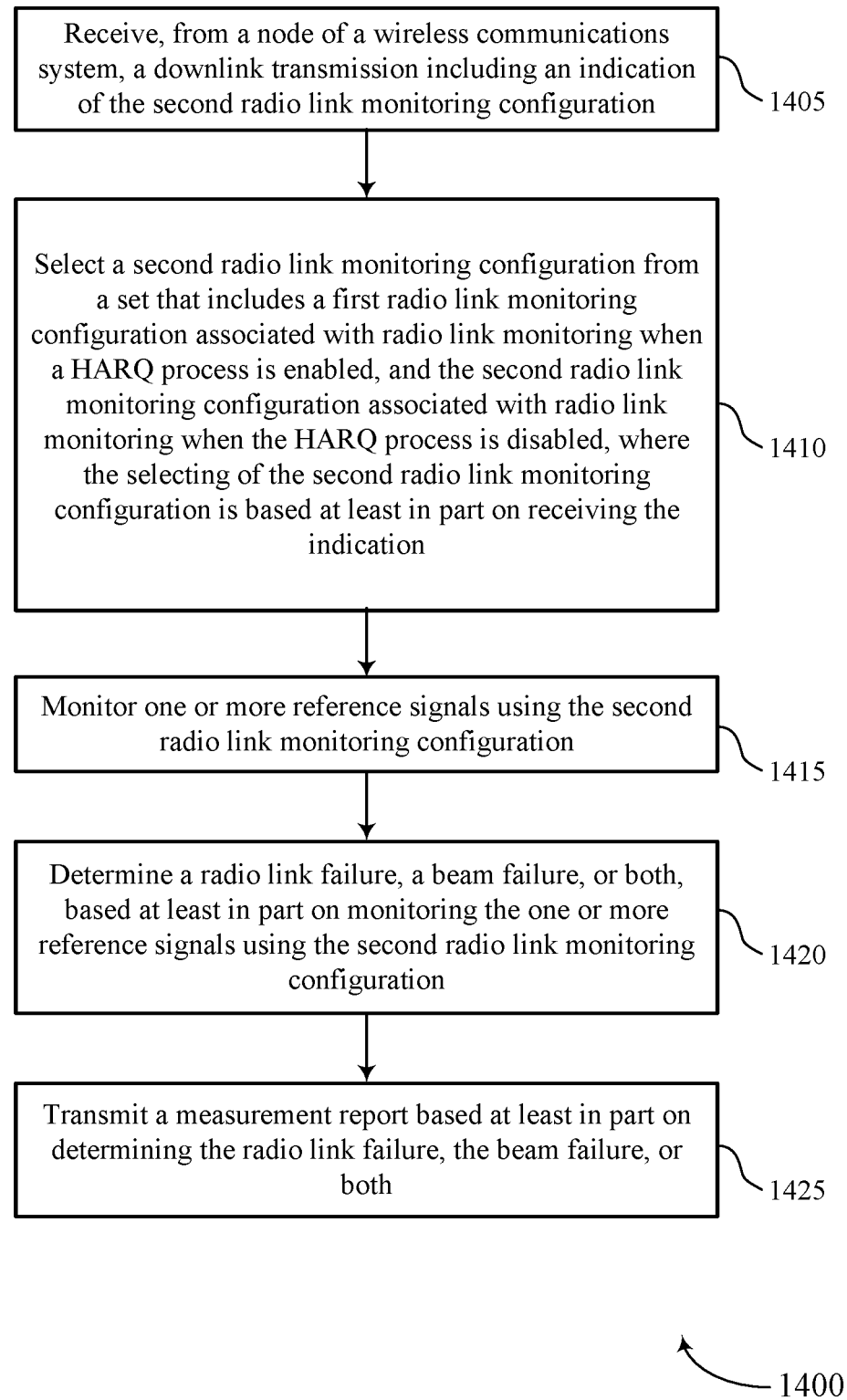

FIG. 14 shows a flowchart illustrating a method 1400 for techniques for determining beam failure or radio link failure in accordance with aspects of the present disclosure. The operations of method 1400 may be implemented by a UE or its components as described herein. For example, the operations of method 1400 may be performed by a UE 115 as described with reference to FIGS. 1 through 7. In some examples, a UE may execute a set of instructions to control the functional elements of the device to perform the described functions. Additionally or alternatively, the UE may perform aspects of the described functions using special-purpose hardware.

At 1405, the method may include receiving, from a node of a wireless communications system, a downlink transmission comprising an indication of the second radio link monitoring configuration. The operations of 1405 may be performed according to the methods described herein. In some examples, aspects of the operations of 1405 may be performed by a downlink reception manager 650 as described with reference to FIG. 6.

At 1410, the method may include selecting a second radio link monitoring configuration from a first radio link monitoring configuration associated with radio link monitoring over at least a duration that a HARQ process is enabled, and the second radio link monitoring configuration associated with radio link monitoring over at least a duration that the HARQ process is disabled, wherein the selecting of the second radio link monitoring configuration is based at least in part on receiving the indication. The operations of 1410 may be performed according to the methods described herein. In some examples, aspects of the operations of 1410 may be performed by a radio link monitoring configuration manager 625 as described with reference to FIG. 6.

At 1415, the method may include monitoring one or more reference signals using the second radio link monitoring configuration. The operations of 1415 may be performed according to the methods described herein. In some examples, aspects of the operations of 1415 may be performed by a reference signal monitoring manager 630 as described with reference to FIG. 6.

At 1420, the method may include determining a radio link failure, a beam failure, or both has occurred based at least in part on monitoring the one or more reference signals using the second radio link monitoring configuration. The operations of 1420 may be performed according to the methods described herein. In some examples, aspects of the operations of 1420 may be performed by a radio link/beam failure detection manager 635 as described with reference to FIG. 6.

At 1425, the method may include transmitting a measurement report based at least in part on determining the radio link failure, the beam failure, or both has occurred. The operations of 1425 may be performed according to the methods described herein. In some examples, aspects of the operations of 1425 may be performed by a measurement report transmitting manager 640 as described with reference to FIG. 6.

Figure 15:
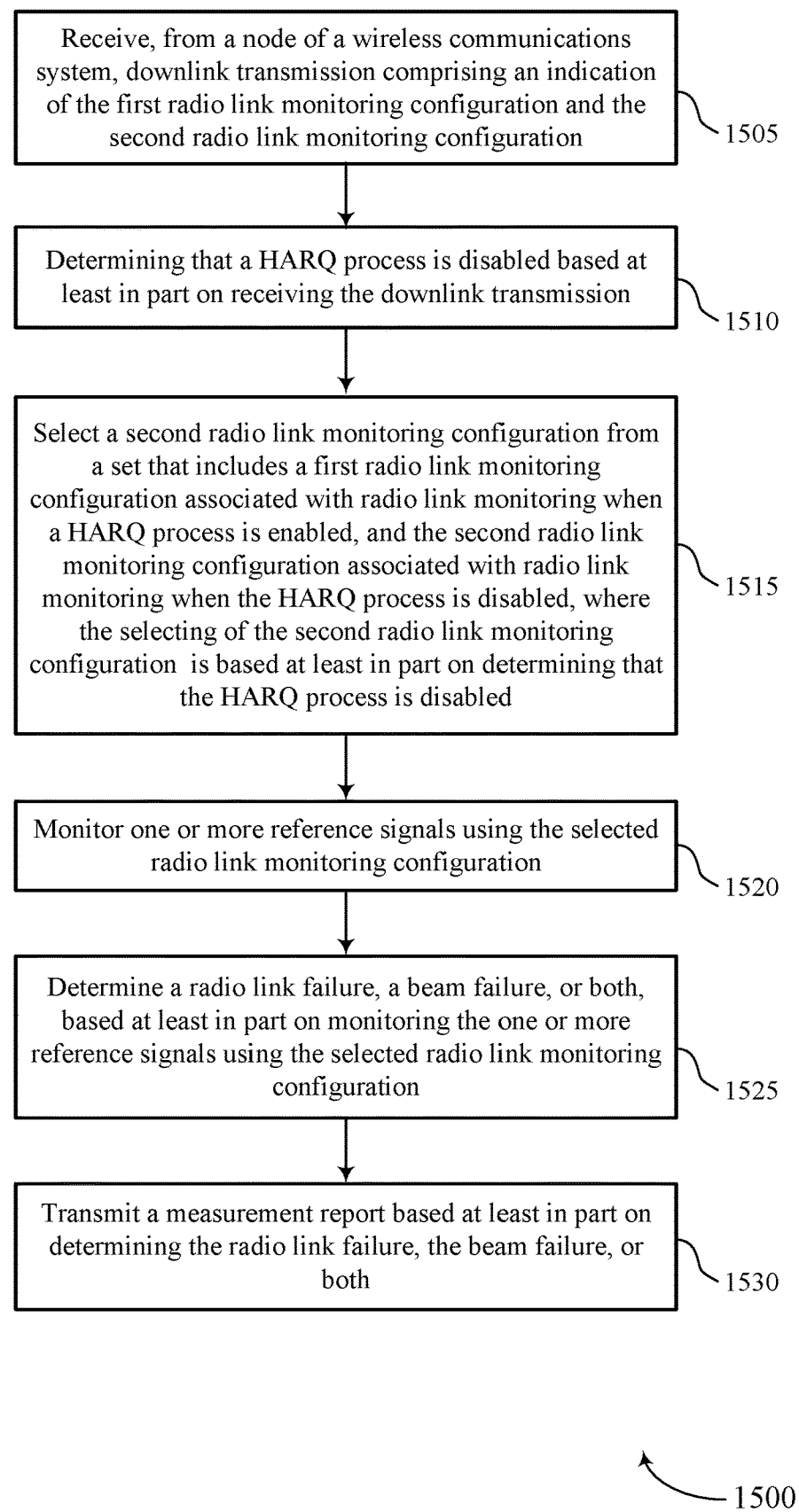

FIG. 15 shows a flowchart illustrating a method 1500 for techniques for determining beam failure or radio link failure in accordance with aspects of the present disclosure. The operations of method 1500 may be implemented by a UE or its components as described herein. For example, the operations of method 1500 may be performed by a UE 115 as described with reference to FIGS. 1 through 7. In some examples, a UE may execute a set of instructions to control the functional elements of the device to perform the described functions. Additionally or alternatively, the UE may perform aspects of the described functions using special-purpose hardware.

At 1505, the method may include receiving, from a node of a wireless communications system, downlink transmission comprising an indication of the first radio link monitoring configuration and the second radio link monitoring configuration, wherein the selecting of the radio link monitoring configuration from the set that includes the first radio link monitoring configuration and the second radio link monitoring configuration is based at least in part on receiving the downlink transmission. The operations of 1505 may be performed according to the methods described herein. In some examples, aspects of the operations of 1505 may be performed by a downlink reception manager 650 as described with reference to FIG. 6.

At 1510, the method may include determining that a HARQ process is disabled based at least in part on receiving the downlink transmission. The operations of 1510 may be performed according to the methods described herein. In some examples, aspects of the operations of 1510 may be performed by a downlink reception manager 650 as described with reference to FIG. 6.

At 1515, the method may include selecting a second radio link monitoring configuration from a first radio link monitoring configuration associated with radio link monitoring over at least a duration that a HARQ process is enabled, and the second radio link monitoring configuration associated with radio link monitoring over at least a duration that the HARQ process is disabled, where the selecting of the second radio link monitoring configuration is based at least in art on determining that the HARQ process is disabled. The operations of 1515 may be performed according to the methods described herein. In some examples, aspects of the operations of 1515 may be performed by a radio link monitoring configuration manager 625 as described with reference to FIG. 6.

At 1520, the method may include monitoring one or more reference signals using the second radio link monitoring configuration. The operations of 1520 may be performed according to the methods described herein. In some examples, aspects of the operations of 1520 may be performed by a reference signal monitoring manager 630 as described with reference to FIG. 6.

At 1525, the method may include determining a radio link failure, a beam failure, or both has occurred based at least in part on monitoring the one or more reference signals using the second radio link monitoring configuration. The operations of 1525 may be performed according to the methods described herein. In some examples, aspects of the operations of 1525 may be performed by a radio link/beam failure detection manager 635 as described with reference to FIG. 6.

At 1520, the method may include transmitting a measurement report based at least in part on determining the radio link failure, the beam failure, or both has occurred. The operations of 1530 may be performed according to the methods described herein. In some examples, aspects of the operations of 1530 may be performed by a measurement report transmitting manager 640 as described with reference to FIG. 6.

Figure 16:
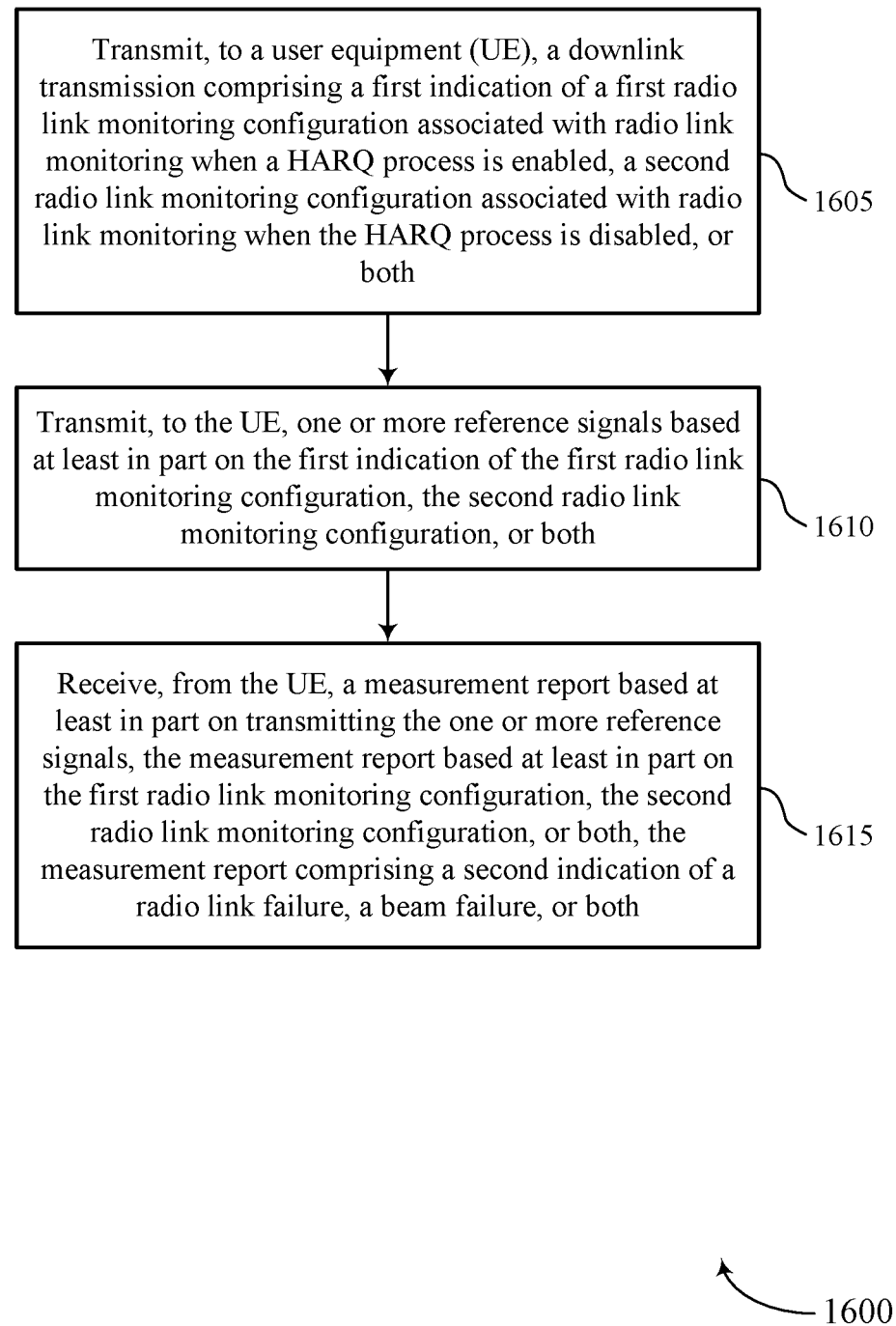

FIG. 16 shows a flowchart illustrating a method 1600 for techniques for determining beam failure or radio link failure in accordance with aspects of the present disclosure. The operations of method 1600 may be implemented by a base station or its components as described herein. For example, the operations of method 1600 may be performed by a base station 105 as described with reference to FIGS. 1 through 3 and 8 through 11. In some examples, a base station may execute a set of instructions to control the functional elements of the device to perform the described functions. Additionally or alternatively, the base station may perform aspects of the described functions using special-purpose hardware.

At 1605, the method may include transmitting, to a UE, a downlink transmission comprising a first indication of a first radio link monitoring configuration associated with radio link monitoring over at least a duration that a HARQ process is enabled, a second radio link monitoring configuration associated with radio link monitoring over at least a duration that the HARQ process is disabled, or both. The operations of 1605 may be performed according to the methods described herein. In some examples, aspects of the operations of 1605 may be performed by a downlink transmission manager 1025 as described with reference to FIG. 10.

At 1610, the method may include transmitting, to the UE, one or more reference signals based at least in part on the first indication of the first radio link monitoring configuration, the second radio link monitoring configuration, or both. The operations of 1610 may be performed according to the methods described herein. In some examples, aspects of the operations of 1610 may be performed by a reference signal transmitting manager 1030 as described with reference to FIG. 10.

At 1615, the method may include receiving, from the UE, a measurement report based at least in part on transmitting the one or more reference signals, the measurement report based at least in part on the first radio link monitoring configuration, the second radio link monitoring configuration, or both, the measurement report comprising a second indication of a radio link failure, a beam failure, or both. The operations of 1615 may be performed according to the methods described herein. In some examples, aspects of the operations of 1615 may be performed by a measurement report receiving manager 1035 as described with reference to FIG. 10.

The following provides an overview of aspects of the present disclosure:

Aspect 1: A method for wireless communication at a UE, comprising: selecting a radio link monitoring configuration from a first radio link monitoring configuration associated with radio link monitoring over at least a duration that a HARQ process is enabled and a second radio link monitoring configuration associated with radio link monitoring over at least a duration that the HARQ process is disabled; monitoring one or more reference signals using the selected radio link monitoring configuration; determining a radio link failure, a beam failure, or both has occurred based at least in part on monitoring the one or more reference signals using the selected radio link monitoring configuration; and transmitting a measurement report based at least in part on determining the radio link failure, the beam failure, or both has occurred.

Aspect 2: The method of aspect 1, further comprising: determining a first BLER threshold and a second BLER threshold associated with the first radio link monitoring configuration, the first BLER threshold comprising a first in-sync detection threshold and the second BLER threshold comprising a first out-of-sync detection threshold; and determining a third BLER threshold and a fourth BLER threshold associated with the second radio link monitoring configuration, the third BLER threshold comprising a second in-sync detection threshold and the fourth BLER threshold comprising a second out-of-sync detection threshold, wherein the first BLER threshold, the second BLER threshold, the third BLER threshold, and the fourth BLER threshold are associated with a radio link failure detection procedure at the UE.

Aspect 3: The method of aspect 2, wherein the first BLER threshold and the third BLER threshold each comprise a $BLER_{in}$ threshold, and the second BLER threshold and the fourth BLER threshold each comprise a $BLER_{out}$ threshold.

Aspect 4: The method of aspect 3, wherein the first BLER threshold, the third BLER threshold, or both, is configured to trigger an in-sync indication if a BLER for at least one reference signal of the one or more reference signals is greater than the first BLER threshold, the third BLER threshold, or both, and wherein the second BLER threshold, the fourth BLER threshold, or both, is configured to trigger an out-of-sync indication if a BLER associated with each of the one or more reference signals is less than the second BLER threshold, the fourth BLER threshold, or both Aspect 5: The method of any of aspects 2 through 4, wherein the first BLER threshold is greater than the third BLER threshold, and the second BLER threshold is greater than the fourth BLER threshold.

Aspect 6: The method of any of aspects 2 through 5, further comprising: selecting the second radio link monitoring configuration; determining one or more BLERs associated with the one or more reference signals based at least in part on monitoring the one or more reference signals using the second radio link monitoring configuration; and determining that the one or more BLERs satisfy the third BLER threshold, the fourth BLER threshold, or both, wherein the determining of the radio link failure, the beam failure, or both has occurred is based at least in part on determining the one or more BLERs satisfy the third BLER threshold, the fourth BLER threshold, or both.

Aspect 7: The method of any of aspects 2 through 6, further comprising: selecting the first radio link monitoring configuration; determining a fifth BLER threshold associated with the first radio link monitoring configuration, the fifth BLER threshold less than the second BLER threshold and greater than the first BLER threshold, the fifth BLER threshold comprising a third out-of-sync detection threshold associated with the radio link failure detection procedure at the UE; and determining that one or more BLERs satisfy the fifth BLER threshold, wherein the determining of the radio link failure, the beam failure, or both has occurred is based at least in part on determining the one or more BLERs satisfy the fifth BLER threshold.

Aspect 8: The method of any of aspects 2 through 7, the method further comprising: selecting the second radio link monitoring configuration; determining a sixth BLER threshold associated with the second radio link monitoring configuration, the sixth BLER threshold less than the fourth BLER threshold and greater than the third BLER threshold, the sixth BLER threshold comprising a third out-of-sync detection threshold associated with the radio link failure detection procedure at the UE; and determining that one or more BLERs satisfy the sixth BLER threshold, wherein the determining of the radio link failure, the beam failure, or both has occurred is based at least in part on determining the one or more BLERs satisfy the sixth BLER threshold.

Aspect 9: The method of any of aspects 1 through 8, further comprising: receiving, from a node of a wireless communications system, a downlink transmission comprising an indication of the second radio link monitoring configuration, wherein the selecting of the radio link monitoring configuration from the first radio link monitoring configuration and the second radio link monitoring configuration is based at least in part on receiving the indication.

Aspect 10: The method of aspect 9, wherein the downlink transmission comprises an RRC message, a MAC-CE message, or both.

Aspect 11: The method of any of aspects 1 through 10, further comprising: receiving, from a node of a wireless communications system, downlink transmission comprising an indication of the first radio link monitoring configuration and the second radio link monitoring configuration, wherein the selecting of the radio link monitoring configuration from the first radio link monitoring configuration and the second radio link monitoring configuration is based at least in part on receiving the downlink transmission.

Aspect 12: The method of aspect 11, further comprising: determining that the HARQ process is disabled based at least in part on receiving the downlink transmission; and selecting the second radio link monitoring configuration is based at least in part on determining that the HARQ process is disabled.

Aspect 13: The method of any of aspects 11 through 12, wherein the downlink transmission comprises an RRC message, a SIB message, or both.

Aspect 14: The method of any of aspects 1 through 13, further comprising: determining a second BLER threshold associated with the second radio link monitoring configuration, where a first BLER threshold associated with the first radio link monitoring configuration is greater than the second BLER threshold associated with the second radio link monitoring configuration, the first BLER threshold and the second BLER threshold associated with a beam failure detection procedure at the UE.

Aspect 15: The method of aspect 14, further comprising: selecting the second radio link monitoring configuration; determining a BLER associated with a beam based at least in part on monitoring the one or more reference signals; and determining that the BLER satisfies the second BLER threshold associated with the second radio link monitoring configuration, wherein the determining of the radio link failure, the beam failure, or both has occurred is based at least in part on determining that the BLER satisfies the second BLER threshold.

Aspect 16: The method of any of aspects 1 through 15, wherein the one or more reference signals are received from a node of an NTN.

Aspect 17: The method of any of aspects 1 through 16, wherein the selecting of the radio link monitoring configuration from the first radio link monitoring configuration and the second radio link monitoring configuration comprises selecting the second radio link monitoring configuration.

Aspect 18: The method of any of aspects 1 through 17, further comprising: determining a BLER of a hypothetical physical downlink control channel associated with the selected radio link monitoring configuration, wherein the determining of the radio link failure, the beam failure, or both has occurred is based at least in part on the BLER of the hypothetical physical downlink control channel.

Aspect 19: A method for wireless communication at a network device, comprising: transmitting, to a UE, a downlink transmission comprising a first indication of a first radio link monitoring configuration associated with radio link monitoring over at least a duration that a HARQ process is enabled, a second radio link monitoring configuration associated with radio link monitoring over at least a duration that the HARQ process is disabled, or both; transmitting, to the UE, one or more reference signals based at least in part on the first indication of the first radio link monitoring configuration, the second radio link monitoring configuration, or both; and receiving, from the UE, a measurement report based at least in part on transmitting the one or more reference signals, the measurement report based at least in part on the first radio link monitoring configuration, the second radio link monitoring configuration, or both, the measurement report comprising a second indication of a radio link failure, a beam failure, or both.

Aspect 20: The method of aspect 19, wherein the first indication indicates the second radio link monitoring configuration, and the measurement report is based at least in part on the second radio link monitoring configuration.

Aspect 21: The method of aspect 20, further comprising: determining a first BLER threshold and a second BLER threshold associated with the first radio link monitoring configuration, the first BLER threshold comprising a first in-sync detection threshold and the second BLER threshold comprising a first out-of-sync detection threshold; and determining a third BLER threshold and a fourth BLER threshold associated with the second radio link monitoring configuration, the third BLER threshold comprising a second in-sync detection threshold and the fourth BLER threshold comprising a second out-of-sync detection threshold, wherein the first BLER threshold, the second BLER threshold, the third BLER threshold, and the fourth BLER threshold are associated with a radio link failure detection procedure at the UE.

Aspect 22: The method of aspect 21, wherein the first BLER threshold and the third BLER threshold each comprise a $BLER_{in}$ threshold, and the second BLER threshold and the fourth BLER threshold each comprise a $BLER_{out}$ threshold.

Aspect 23: The method of any of aspects 21 through 22, wherein the first BLER threshold is greater than the third BLER threshold, and the second BLER threshold is greater than the fourth BLER threshold.

Aspect 24: The method of any of aspects 21 through 23, further comprising: determining a fifth BLER threshold associated with the second radio link monitoring configuration, the fifth BLER threshold greater than the third BLER threshold and less than the fourth BLER threshold, the fifth BLER threshold comprising a third out-of-sync detection threshold associated with the radio link failure detection procedure at the UE; and transmitting, to the UE via the downlink transmission, a third indication of the fifth BLER threshold, wherein receiving the measurement report is based at least in part on the third indication of the fifth BLER threshold.

Aspect 25: The method of any of aspects 20 through 24, wherein the downlink transmission comprises a third indication for the UE to perform radio link monitoring via the second radio link monitoring configuration.

Aspect 26: The method of any of aspects 20 through 25, wherein the downlink transmission comprises an RRC message, a MAC-CE message, or both.

Aspect 27: The method of any of aspects 20 through 26, further comprising: transmitting, to the UE via the downlink transmission, a third indication of the first radio link monitoring configuration, wherein the downlink transmission further comprises a fourth indication for the UE to perform radio link monitoring using the second radio link monitoring configuration over at least a duration that the HARQ process is disabled, and a fifth indication for the UE to perform radio link monitoring using the first radio link monitoring configuration over at least a duration that the HARQ process is enabled.

Aspect 28: The method of aspect 27, wherein the downlink transmission comprises an RRC message, a SIB message, or both.

Aspect 29: The method of any of aspects 20 through 28, further comprising: determining a second BLER threshold associated with the second radio link monitoring configuration, where a first BLER threshold associated with the first radio link monitoring configuration is greater than the second BLER threshold associated with the second radio link monitoring configuration, the first BLER threshold and the second BLER threshold associated with a beam failure detection procedure at the UE.

Aspect 30: The method of any of aspects 20 through 29, wherein the network device comprises a node of an NTN.

Aspect 31: The method of any of aspects 20 through 30, further comprising: determining a BLER of a hypothetical physical downlink control channel associated with the selected radio link monitoring configuration, wherein the measurement report comprising the first indication of the radio link failure, the beam failure, or both, is based at least in part on the BLER of the hypothetical physical downlink control channel.

Aspect 32: An apparatus for wireless communication at a UE, comprising: a processor; memory coupled with the processor; and instructions stored in the memory and executable by the processor to cause the apparatus to perform a method of any of aspects 1 through 18.

Aspect 33: An apparatus for wireless communication at a UE, comprising at least one means for performing a method of any of aspects 1 through 18.

Aspect 34: A non-transitory computer-readable medium storing code for wireless communication at a UE, the code comprising instructions executable by a processor to perform a method of any of aspects 1 through 18.

Aspect 35: An apparatus for wireless communication at a network device, comprising a processor; memory coupled with the processor; and instructions stored in the memory and executable by the processor to cause the apparatus to perform a method of any of aspects 19 through 31.

Aspect 36: An apparatus for wireless communication at a network device, comprising at least one means for performing a method of any of aspects 19 through 31.

Aspect 37: A non-transitory computer-readable medium storing code for wireless communication at a network device, the code comprising instructions executable by a processor to perform a method of any of aspects 19 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   selecting a radio link monitoring configuration from a first radio link monitoring configuration associated with radio link monitoring over at least a duration that a hybrid automatic repeat request (HARQ) process is enabled and a second radio link monitoring configuration associated with radio link monitoring over at least a duration that the HARQ process is disabled;
   monitoring one or more reference signals using the selected radio link monitoring configuration;
   determining a radio link failure, a beam failure, or both have occurred based at least in part on monitoring the one or more reference signals using the selected radio link monitoring configuration; and
   transmitting a measurement report based at least in part on determining the radio link failure, the beam failure, or both have occurred.

2. The method of claim 1, further comprising:
   determining a first block error rate (BLER) threshold and a second BLER threshold associated with the first radio link monitoring configuration, the first BLER threshold comprising a first in-sync detection threshold and the second BLER threshold comprising a first out-of-sync detection threshold; and
   determining a third BLER threshold and a fourth BLER threshold associated with the second radio link monitoring configuration, the third BLER threshold comprising a second in-sync detection threshold and the fourth BLER threshold comprising a second out-of-sync detection threshold, wherein the first BLER threshold, the second BLER threshold, the third BLER threshold, and the fourth BLER threshold are associated with a radio link failure detection procedure at the UE.

3. The method of claim 2, wherein the first BLER threshold and the third BLER threshold each comprise a BLERin threshold, and the second BLER threshold and the fourth BLER threshold each comprise a BLERout threshold.

4. The method of claim 3,
   wherein the first BLER threshold, the third BLER threshold, or both, is configured to trigger an in-sync indication if a BLER for at least one reference signal of the one or more reference signals is greater than the first BLER threshold, the third BLER threshold, or both; and
   wherein the second BLER threshold, the fourth BLER threshold, or both, is configured to trigger an out-of-sync indication if a BLER associated with each of the one or more reference signals is less than the second BLER threshold, the fourth BLER threshold, or both.

5. The method of claim 2, wherein the first BLER threshold is greater than the third BLER threshold, and wherein the second BLER threshold is greater than the fourth BLER threshold.

6. The method of claim 2, further comprising:
   selecting the second radio link monitoring configuration;
   determining one or more BLERs associated with the one or more reference signals based at least in part on monitoring the one or more reference signals using the second radio link monitoring configuration; and
   determining that the one or more BLERs satisfy the third BLER threshold, the fourth BLER threshold, or both, wherein the determining of the radio link failure, the beam failure, or both has occurred is based at least in part on determining the one or more BLERs satisfy the third BLER threshold, the fourth BLER threshold, or both.

7. The method of claim 2, further comprising:
   selecting the first radio link monitoring configuration;
   determining a fifth BLER threshold associated with the first radio link monitoring configuration, the fifth BLER threshold less than the second BLER threshold and greater than the first BLER threshold, the fifth BLER threshold comprising a third out-of-sync detection threshold associated with the radio link failure detection procedure at the UE; and
   determining that one or more BLERs satisfy the fifth BLER threshold, wherein the determining of the radio link failure, the beam failure, or both has occurred is based at least in part on determining the one or more BLERs satisfy the fifth BLER threshold.

8. The method of claim 2, the method further comprising:
   selecting the second radio link monitoring configuration;
   determining a sixth BLER threshold associated with the second radio link monitoring configuration, the sixth BLER threshold less than the fourth BLER threshold and greater than the third BLER threshold, the sixth BLER threshold comprising a third out-of-sync detection threshold associated with the radio link failure detection procedure at the UE; and
   determining that one or more BLERs satisfy the sixth BLER threshold, wherein the determining of the radio link failure, the beam failure, or both has occurred is based at least in part on determining the one or more BLERs satisfy the sixth BLER threshold.

9. The method of claim 1, further comprising:
   receiving, from a node of a wireless communications system, a downlink transmission comprising an indication of the second radio link monitoring configuration, wherein the selecting of the radio link monitoring configuration from the first radio link monitoring configuration and the second radio link monitoring configuration is based at least in part on receiving the indication.

10. The method of claim 9, wherein the downlink transmission comprises a radio resource control message, a MAC-CE message, or both.

11. The method of claim 1, further comprising:
   receiving, from a node of a wireless communications system, downlink transmission comprising an indication of the first radio link monitoring configuration and the second radio link monitoring configuration, wherein the selecting of the radio link monitoring configuration from the first radio link monitoring configuration and the second radio link monitoring configuration is based at least in part on receiving the downlink transmission.

12. The method of claim 11, further comprising:
determining that the HARQ process is disabled based at least in part on receiving the downlink transmission; and
selecting the second radio link monitoring configuration is based at least in part on determining that the HARQ process is disabled.

13. The method of claim 11, wherein the downlink transmission comprises a radio resource control message, a system information broadcast message, or both.

14. The method of claim 1, further comprising:
determining a second block error rate (BLER) threshold associated with the second radio link monitoring configuration, where a first BLER threshold associated with the first radio link monitoring configuration is greater than the second BLER threshold associated with the second radio link monitoring configuration, the first BLER threshold and the second BLER threshold associated with a beam failure detection procedure at the UE.

15. The method of claim 14, further comprising:
selecting the second radio link monitoring configuration;
determining a BLER associated with a beam based at least in part on monitoring the one or more reference signals; and
determining that the BLER satisfies the second BLER threshold associated with the second radio link monitoring configuration, wherein the determining of the radio link failure, the beam failure, or both has occurred is based at least in part on determining that the BLER satisfies the second BLER threshold.

16. The method of claim 1, wherein the one or more reference signals are received from a node of a non-terrestrial network.

17. The method of claim 1, wherein the selecting of the radio link monitoring configuration from the first radio link monitoring configuration and the second radio link monitoring configuration comprises selecting the second radio link monitoring configuration.

18. The method of claim 1, further comprising:
determining a block error rate (BLER) of a hypothetical physical downlink control channel associated with the selected radio link monitoring configuration, wherein the determining of the radio link failure, the beam failure, or both has occurred is based at least in part on the BLER of the hypothetical physical downlink control channel.

19. A method for wireless communication at a network device, comprising:
transmitting, to a user equipment (UE), a downlink transmission comprising a first indication of a first radio link monitoring configuration associated with radio link monitoring over at least a duration that a hybrid automatic repeat request (HARQ) process is enabled, a second radio link monitoring configuration associated with radio link monitoring over at least a duration that the HARQ process is disabled, or both;
transmitting, to the UE, one or more reference signals based at least in part on the first indication of the first radio link monitoring configuration, the second radio link monitoring configuration, or both; and
receiving, from the UE, a measurement report based at least in part on transmitting the one or more reference signals, the measurement report based at least in part on the first radio link monitoring configuration, the second radio link monitoring configuration, or both, the measurement report comprising a second indication of a radio link failure, a beam failure, or both.

20. The method of claim 19, wherein the first indication indicates the second radio link monitoring configuration, and wherein the measurement report is based at least in part on the second radio link monitoring configuration.

21. The method of claim 20, further comprising:
determining a first block error rate (BLER) threshold and a second BLER threshold associated with the first radio link monitoring configuration, the first BLER threshold comprising a first in-sync detection threshold and the second BLER threshold comprising a first out-of-sync detection threshold; and
determining a third BLER threshold and a fourth BLER threshold associated with the second radio link monitoring configuration, the third BLER threshold comprising a second in-sync detection threshold and the fourth BLER threshold comprising a second out-of-sync detection threshold, wherein the first BLER threshold, the second BLER threshold, the third BLER threshold, and the fourth BLER threshold are associated with a radio link failure detection procedure at the UE.

22. The method of claim 21, wherein the first BLER threshold and the third BLER threshold each comprise a BLERin threshold, and wherein the second BLER threshold and the fourth BLER threshold each comprise a BLERout threshold.

23. The method of claim 21, wherein the first BLER threshold is greater than the third BLER threshold, and wherein the second BLER threshold is greater than the fourth BLER threshold.

24. The method of claim 21, further comprising:
determining a fifth BLER threshold associated with the second radio link monitoring configuration, the fifth BLER threshold greater than the third BLER threshold and less than the fourth BLER threshold, the fifth BLER threshold comprising a third out-of-sync detection threshold associated with the radio link failure detection procedure at the UE; and
transmitting, to the UE via the downlink transmission, a third indication of the fifth BLER threshold, wherein receiving the measurement report is based at least in part on the third indication of the fifth BLER threshold.

25. The method of claim 20, wherein the downlink transmission comprises a third indication for the UE to perform radio link monitoring via the second radio link monitoring configuration.

26. The method of claim 20, wherein the downlink transmission comprises a radio resource control message, a MAC-CE message, or both.

27. The method of claim 20, further comprising:
transmitting, to the UE via the downlink transmission, a third indication of the first radio link monitoring configuration, wherein the downlink transmission further comprises a fourth indication for the UE to perform radio link monitoring using the second radio link monitoring configuration over at least a duration that the HARQ process is disabled, and a fifth indication for the UE to perform radio link monitoring using the first radio link monitoring configuration over at least a duration that the HARQ process is enabled.

28. The method of claim 27, wherein the downlink transmission comprises a radio resource control message, a system information broadcast message, or both.

29. A user equipment (UE), comprising:

a transmitter;

a processor;

memory coupled with the processor; and instructions stored in the memory and operable, when executed by the processor, to cause the UE to:

select a radio link monitoring configuration from a first radio link monitoring configuration associated with radio link monitoring over at least a duration that a hybrid automatic repeat request (HARQ) process is enabled and a second radio link monitoring configuration associated with radio link monitoring over at least a duration that the HARQ process is disabled;

monitor one or more reference signals using the selected radio link monitoring configuration;

determine a radio link failure, a beam failure, or both have occurred based at least in part on monitoring the one or more reference signals using the selected radio link monitoring configuration; and transmit, via the transmitter, a measurement report based at least in part on determining the radio link failure, the beam failure, or both have occurred.

30. A a network device, comprising:

a transmitter;

a receiver;

a processor;

memory coupled with the processor; and instructions stored in the memory and operable, when executed by the processor, to cause the network device to:

transmit, to a user equipment (UE) and via the transmitter, a downlink transmission comprising a first indication of a first radio link monitoring configuration associated with radio link monitoring over at least a duration that a hybrid automatic repeat request (HARQ) process is enabled, a second radio link monitoring configuration associated with radio link monitoring over at least a duration that the HARQ process is disabled, or both;

transmit, to the UE and via the transmitter, one or more reference signals based at least in part on the first indication of the first radio link monitoring configuration, the second radio link monitoring configuration, or both; and receive, from the UE and via the receiver, a measurement report based at least in part on transmitting the one or more reference signals, the measurement report based at least in part on the first radio link monitoring configuration, the second radio link monitoring configuration, or both, the measurement report comprising a second indication of a radio link failure, a beam failure, or both.

\* \* \* \* \*